United States Patent
Ooi et al.

(10) Patent No.: US 7,925,171 B2
(45) Date of Patent: Apr. 12, 2011

(54) OPTICAL TRANSMISSION APPARATUS

(75) Inventors: Hiroki Ooi, Kawasaki (JP); George Ishikawa, Kawasaki (JP); Daisuke Tanimura, Tokyo (JP); Hirotoshi Kodaka, Tokyo (JP)

(73) Assignees: Fujitsu Limited, Kawasaki (JP); Yokogawa Electric Corporation, Tokyo (JP)

( * ) Notice: Subject to any disclaimer, the term of this patent is extended or adjusted under 35 U.S.C. 154(b) by 1040 days.

(21) Appl. No.: 11/606,390

(22) Filed: Nov. 30, 2006

(65) Prior Publication Data

US 2007/0212079 A1  Sep. 13, 2007

(30) Foreign Application Priority Data

Nov. 30, 2005 (JP) ................................. 2005-346581

(51) Int. Cl.
*H04B 10/04* (2006.01)
(52) U.S. Cl. ........ 398/198; 398/192; 398/194; 398/195; 398/200; 398/201
(58) Field of Classification Search .......... 398/182–201; 359/158
See application file for complete search history.

(56) References Cited

U.S. PATENT DOCUMENTS

| | | | | |
|---|---|---|---|---|
| 5,644,664 | A * | 7/1997 | Burns et al. ..................... | 385/2 |
| 6,215,941 | B1 * | 4/2001 | Nagai et al. ..................... | 385/136 |
| 6,236,488 | B1 * | 5/2001 | Shimizu et al. ................. | 398/198 |
| 7,274,879 | B1 * | 9/2007 | Sandler et al. .................. | 398/147 |
| 2001/0009469 | A1 | 7/2001 | Shimizu et al. | |
| 2002/0033998 | A1 * | 3/2002 | Kakui et al. .................. | 359/341.5 |
| 2002/0149824 | A1 | 10/2002 | Beaulieu et al. | |
| 2002/0191255 | A1 * | 12/2002 | Glingener et al. ............ | 359/158 |
| 2002/0191260 | A1 | 12/2002 | Bergano | |
| 2003/0053383 | A1 * | 3/2003 | Watanabe .................. | 369/44.34 |
| 2003/0112487 | A1 | 6/2003 | Fuller et al. | |
| 2003/0185575 | A1 * | 10/2003 | Ikeuchi ......................... | 398/197 |
| 2004/0081470 | A1 | 4/2004 | Griffin | |
| 2004/0184819 | A1 * | 9/2004 | Vassilieva et al. ............ | 398/188 |
| 2004/0190910 | A1 * | 9/2004 | Akiyama et al. .............. | 398/186 |
| 2004/0208635 | A1 | 10/2004 | Sinsky | |
| 2004/0208649 | A1 * | 10/2004 | Matthews et al. ............. | 398/195 |

FOREIGN PATENT DOCUMENTS

| | | |
|---|---|---|
| EP | 1462848 A2 | 9/2004 |
| JP | 61-3539 | 1/1986 |
| JP | 10-336154 | 12/1998 |
| JP | 2002-353896 | 12/2002 |

(Continued)

OTHER PUBLICATIONS

European Search Report issued in a corresponding European Patent Application on Mar. 6, 2007.
Shun Yao et al., "Advances in Photonic Packet Switching: An Overview", IEEE Communications Magazine, vol. 38, No. 2, pp. 84-94, Feb. 2000.

(Continued)

*Primary Examiner* — Li Liu
(74) *Attorney, Agent, or Firm* — Staas & Halsey LLP

(57) ABSTRACT

An optical transmission apparatus according to the present invention comprises: a plurality of optical modulating sections serially connected to each other via optical fibers; driving sections corresponding to the optical modulating sections; delay amount varying sections that provide variable delay amounts for modulating signals to be input to the driving sections, to adjust timing between drive signals to be provided for the optical modulating sections; temperature monitoring sections that monitor the temperature of each of the optical fibers and the like; and a delay amount control section that controls the delay amount in each of the delay amount varying sections based on the monitored temperatures.

18 Claims, 28 Drawing Sheets

FOREIGN PATENT DOCUMENTS

| | | |
|---|---|---|
| JP | 2004-516743 | 6/2004 |
| JP | 2004-294883 | 10/2004 |

OTHER PUBLICATIONS

G. I. Papadimitriou et al., "Optical Switching: Switch Fabrics, Techniques, and Architectures", Journal of Lightwave Technology, vol. 21, No. 2, pp. 384-405, Feb. 2003.

Extended European Search Report issued in a corresponding European Patent Application No. 06024799.6-2415 on May 16, 2007.

T. Hoshida et al., "Optimal 40 Gb/s Modulation Formats for Spectrally Efficient Long-Haul DWDM Systems", Journal of Lightwave Technology, vol. 20, No. 12, pp. 1989-1996.

O. Vassilieva et al., "Non Linear Tolerant and Spectrally Efficient 86 Gbit/s RZ-DQPSK Format for a System Upgrade", OFC 2003, ThE7, pp. 458-460, 2003.

A. Sano et al., "Performance Evaluation of Prechirped RZ and CS-RZ Formats in High Speed Transmission Systems With Dispersion Management", Journal of Lightwave Technology, vol. 19, No. 12, pp. 1864-1871, Dec. 2001.

Y. Miyamoto et al., "1.2 Tbit/s (30×42.7 Gbit/s ETDM optical channel) WDM transmission over 376 km with 125 km spacing using forward error correction and carrier-supressed RZ format", Optical Fiber Communication Conference 2000 (OFC 2000), Pd26, pp. 245-247, 2000.

G. Ishikawa et al., "80-Gb/s (2×40-Gb/s) Transmission experiments over 667-km Dispersion-shifted fiber using Ti:LiNbO$_3$ OTDM modulator and demultiplexer", ECOC'96 ThC3.3, pp. 37-40, 1996.

Japanese Office Action dated Jul. 6, 2010 issued in Japanese Patent Application No. 2005-346581.

\* cited by examiner

CONFIGURATION EXAMPLE OF 43Gb/s (CS)RZ-DPSK MODULATION FORMAT

OPTICAL TRANSMISSION APPARATUS 110

OPTICAL RECEPTION APPARATUS 130

(CS)RZ-DPSK MODULATION FORMAT

CONFIGURATION EXAMPLE OF 43Gb/s (CS)RZ-DQPSK MODULATION FORMAT (CS)RZ-DQPSK MODULATION FORMAT

DELAY VARIATION AMOUNT (ps)
(LENGTH: 0.5m, TEMPERATURE DIFFERENCE: 80°C)

43G CSRZ-DPSK

RELATIVE DELAY AMOUNT (ps)

OPTICAL TRANSMISSION APPARATUS

BACKGROUND OF THE INVENTION

1. Field of the Invention

The present invention relates to an optical transmission apparatus provided with a plurality of modulating sections, and in particular, to an optical transmission apparatus capable of compensating for the delay deviation depending on the temperature variation between drive signals.

2. Description of the Related Art

In recent years, there have been increased demands for introducing a 40 Gbit/s optical transmission system of next generation, and furthermore, such a system is required to achieve a transmission distance and frequency utilization efficiency equivalent to those of a 10 Gbit/s system. As means for realizing such a system, there has been actively performed the search and development of the RZ-DPSK (Differential Phase Shift Keying) modulation or the CSRZ-DPSK modulation, which is a modulation format with excellent optical signal-to-noise ratio (OSNR) efficiency and excellent non-linear tolerance, in comparison with a NRZ (Non Return to Zero) modulation format which has been applied to a conventional system of 10 Gbit/s or lower (refer to the literature 1: T. Hoshida et al., "Optimal 40 Gb/s Modulation Formats for Spectrally Efficient Long-Haul DWDM Systems", Journal of Lightwave Technology, vol. 20, No. 12, pp. 1989-1996, December 2002, and the literature 2: O. Vassilieva et al., "Non-Linear Tolerant and Spectrally Efficient 86 Gbit/s RZ-DQPSK Format for a System Upgrade", OFC 2003, ThE7, 2003). Moreover, in addition to the above modulation format, there has also been actively performed the search and development of a phase modulation format such as the RZ-DQPSK (Differential Quadrature Phase-Shift Keying) modulation or a CSRZ-DQPSK modulation, which has a feature of narrow spectrum (high frequency utilization efficiency).

FIG. 22 is a diagram showing a configuration example of an optical transmission apparatus and an optical reception apparatus to which a RZ-DPSK or CSRZ-DPSK modulation format of 43 Gbit/s is adopted. Further, FIG. 23 is a graph showing states of optical intensity and optical phase in the case where a RZ-DPSK or CSRZ-DPSK modulated optical signal is transmitted/received.

In FIG. 22, an optical transmission apparatus 110 is for transmitting an optical signal in the RZ-DPSK or CSRZ-DPSK modulation format of 43 Gbit/s, and comprises, for example, a transmission data processing section 111, a CW (Continuous Wave) light source 112, a phase modulator 113 and a RZ pulsing intensity modulator 114.

To be specific, the transmission data processing section 111 is provided with a function as a framer for framing input data and a function as a FEC (Forward Error Correction) encoder for giving an error-correcting code, and also, is provided with a function as a DPSK pre-coder for performing the coding processing reflected with information of a difference between a code of 1 bit before and a current code.

The phase modulator 113 phase modulates a continuous light from the CW light source 112 in accordance with coded data from the transmission data processing section 111, to output an optical signal in which optical intensity thereof is fixed but a binary optical phase thereof carries information, that is, a DPSK modulated optical signal (refer to a lower stage of FIG. 23).

The RZ pulsing intensity modulator 114 is for RZ pulsing the optical signal from the phase modulator 113 (refer to an upper stage of FIG. 23). In particular, an optical signal which is RZ pulsed using a clock drive signal having a frequency (43 GHz) same as a bit rate of data and also having the amplitude of 1 time an extinction voltage ($V\pi$), is called a RZ-DPSK signal, and further, an optical which is RZ pulsed using a clock drive signal having a frequency (21.5 GHz) half the bit rate of data and also having the amplitude of 2 times the extinction voltage ($V\pi$), is called a CSRZ-DPSK signal.

Further, an optical reception apparatus 130 is connected to the optical transmission apparatus 110 via a transmission path 120 and an optical repeater 121, to perform the reception processing on the (CS)RZ-DPSK signal from the optical transmission apparatus 110, which has been optical repeatedly transmitted, and comprises, for example, a delay interferometer 131, a photoelectric converting section 132, a regeneration circuit 133 and a received data processing section 134.

To be specific, the delay interferometer 131 is configured by, for example, a Mach-Zehnder interferometer, and for the (CS)RZ-DPSK signal transmitted via the transmission path 120, makes a delay component per 1 bit time (23.3 ps in the configuration example of FIG. 22) and a component phase controlled of 0 rad to interfere (delay interfere) with each other, to output interference results thereof as two outputs. Incidentally, the above Mach-Zehnder interferometer is configured so that one of branched waveguides is formed to be longer than the other branched waveguide by the propagation length equivalent to the 1 bit time, and also, is formed with an electrode for phase controlling the optical signal propagated through the other branched waveguide.

The photoelectric converting section 132 is configured by a dual pin photodiode for receiving the respective outputs from the delay interferometer 131 to perform the differential photoelectric conversion detection (balanced detection). Incidentally, received signals detected by the photoelectric converting section 132 are appropriately amplified by an amplifier.

The regeneration circuit 133 is for extracting a data signal and a clock signal from the received signals which are subjected to the differential photoelectric conversion detection in the photoelectric converting section 132.

The received data processing section 134 is for performing the signal processing, such as an error correction and the like, based on the data signal and the clock signal extracted by the regeneration circuit.

FIG. 24 is a diagram showing a configuration example of an optical transmission apparatus and an optical reception apparatus to which a RZ-DQPSK or CSRZ-DQPSK modulation format of 43 Gbit/s is adopted. Further, FIG. 25 is a graph showing states of optical intensity and optical phase in the case where a RZ-DQPSK or CSRZ-DQPSK modulated optical signal is transmitted/received. Incidentally, the configuration of the optical transmission and reception apparatuses corresponding to the RZ-DQPSK or CSRZ-DQPSK modulation format is recited in detail in Japanese National Phase Patent Publication No. 2004-516743, and therefore, the outline thereof will be described here.

In FIG. 24, an optical transmission apparatus 210 comprises, for example, a transmission data processing section 211, a 1:2 demultiplexing section (DEMUX) 212, a CW light source 213, a $\pi/2$ phase shifter 214, two phase modulators 215A and 215B, and a RZ pulsing intensity modulator 216.

To be specific, similarly to the transmission data processing section 111 shown in FIG. 22, the transmission data processing section 211 is provided with functions as a framer and a EFC encoder, and also, is provided with a function of a DQPSK pre-coder for performing the coding processing reflected with information of a difference between a code of 1 bit before and a current code.

The 1:2 demultiplexing section 212 is for demultiplexing coded data of 43 Gbit/s from the transmission data processing section 211 into coded data #1 and #2 in dual series of 21.5 Gbit/s.

The CW light source 213 is for outputting a continuous light, and the output continuous light is separated into two, so that one of the separated lights is input to the phase modulator 215A, and the other is input to the phase modulator 215B via the π/2 phase shifter 214.

The phase modulator 215A modulates the continuous light from the CW light source 213 using the coded data #1 being one of the dual series, which is demultiplexed by the 1:2 demultiplexing section 212, to output an optical signal in which a binary optical phase (0 rad or πgrad) thereof carries information. Further, the phase modulator 215B is input with a light which is obtained by phase shifting by π/2 the continuous light from the CW light source 213 in the π/2 phase shifter 214, and modulates this input light using the coded data #2 being the other series, which is demultiplexed by the 1:2 demultiplexing section 212, to output an optical signal in which a binary optical phase (π/2 rad or 3π/2 rad) thereof carries information. The lights modulated by the phase modulators 215A and 215B are multiplexed with each other, to be output to the latter stage RZ pulsing intensity modulator 216. Namely, the modulated lights from the phase modulators 215A and 215B are multiplexed with each other, so that an optical signal in which optical intensity thereof is fixed but a four-valued optical phase thereof carries information (refer to a lower stage of FIG. 25), that is, a DQPSK modulated optical signal, is sent to the RZ pulsing intensity modulator 216.

The RZ pulsing intensity modulator 216, similarly to the RZ pulsing intensity modulator 114 shown in FIG. 22, is for RZ pulsing the DQPSK modulated signal from the phase modulators 215A and 215B. In particular, an optical signal which is RZ pulsed using a clock drive signal having a frequency (21.5 GHz) same as a bit rate of data #1 and data #2, and also having the amplitude of 1 time an extinction voltage (Vπ), is called a RZ-DQPSK signal, and further, an optical which is RZ pulsed using a clock drive signal having a frequency (10.75 GHz) half the bit rate of data #1 and data #2, and also having the amplitude of 2 times the extinction voltage (Vπ), is called a CSRZ-DQPSK signal.

Further, an optical reception apparatus 230 is connected to the optical transmission apparatus 210 via a transmission path 220 and an optical repeater 221, to perform the reception processing on the (CS)RZ-DQPSK signal from the optical transmission apparatus 210, which has been optical repeatedly transmitted, and comprises, for example, a branching section 231 that branches the received optical signal into two, and also comprises, on optical signal paths through which the branched optical signals are respectively propagated, delay interferometers 232A and 232B, photoelectric converting sections 233A and 233B, and regeneration circuits 234A and 234B, and further, comprises a 2:1 multiplexing section (MUX) 235 that multiplexes the data signals regenerated in the regeneration circuits 234A and 234B, and a received data processing section 236.

To be specific, the delay interferometers 232A and 232B receive respectively the optical signals which are obtained by branching the (CS)RZ-DQPSK signal transmitted through the transmission path 220 and the optical repeater 221 into two by the branching section 231. The delay interferometer 232 A makes a delay component per 1 bit time (46.5 ps in the configuration example of FIG. 24) and a component phase controlled of π/4 rad to interfere (delay interfere) with each other, to output interference results thereof as two outputs. Further, the delay interferometer 232 B makes a delay component per 1 bit time and a component phase controlled of −π/4 rad (which is shifted by π/2 rad to the phase controlled component in the delay interferometer 232A) to interfere (delay interfere) with each other, to output interference results thereof as two outputs. Here, the delay interferometers 232A and 232B each is configured by a Mach-Zehnder interferometer, and each Mach-Zehnder interferometer is configured so that one of branched waveguides is formed to be longer than the other branched waveguide by the propagation length equivalent to the 1 bit time, and also, is formed with an electrode for phase controlling the optical signal propagated through the other branched waveguide.

The photoelectric converting sections 232A and 232B are respectively configured by dual pin photodiodes for receiving the respective outputs from the delay interferometers 232A and 232B to perform the differential photoelectric conversion detection. Incidentally, received signals detected respectively by the photoelectric converting sections 233A and 233B are appropriately amplified by amplifiers.

The regeneration circuit 234A is for regenerating an in-phase component I for a clock signal and a data signal from the received signal detected by the differential photoelectric conversion in the photoelectric converting section 233A. Further, the regeneration circuit 234B is for regenerating a quadrature-phase component Q for a clock signal and a data signal from the received signal detected by the differential photoelectric conversion in the photoelectric converting section 233B.

The 2:1 multiplexing section 235 is for receiving the in-phase component I and the quadrature-phase component Q from the regeneration circuits 234A and 234B, to convert these components into a data signal of 43 Gbit/s before DQPSK modulation.

The received data processing section 234 is for performing the signal processing, such as an error correction and the like, based on the data signal from the 2:1 multiplexing section 235.

The optical transmission apparatuses of (CS)RZ-DPSK modulation format and (CS)RZ-DQPSK modulation format as described in the above, each has a configuration in which a plurality of optical modulators are serially arranged. In the modulation format using such a plurality of optical modulators, there is a problematically possibility that the variation in optical signal delay amount generated among the plurality of optical modulators causes the signal deterioration. Such a problem is common to the cases where the transmission of high bit rate such as 40 Gbit/s or the like is performed in the modulation format using a plurality of optical modulators. Other than the above described (CS)RZ-DPSK modulation format and the (CS)RZ-DQPSK modulation format, there is also a possibility that the variation in optical signal delay amount among the plurality of optical modulators causes the signal deterioration, in a RZ (Return-to-zero) modulation format (refer to the literature: A. Sano et al., "Performance Evaluation of Prechirped RZ and CS-RZ Formats in High-Speed Transmission Systems with Dispersion Management", Journal of Lightwave Technology, Vol. 19, No. 12, pp. 1864-1871, December 2001), a CS-RZ (Carrier-suppressed Return-to-zero) modulation format (refer to the literature: Y. Miyamoto et al., "1.2 Tbit/s (30×42.7 Gbit/s ETDM optical channel) WDM transmission over 376 km with 125 km spacing using forward error correction and carrier-suppressed RZ format", Optical Fiber Communication Conference 2000 (OFC) 2000, Pd26, 2000, an OTDM (Optical time domain multiplexing) modulation format (refer to the literature: G. Ishikawa et al., "80-Gb/s (2×40-Gbs) Transmission experiments over 667-km Dispersion-shifted fiber using Ti:LiNbO$_3$ OTDM modulation and demultiplexer", ECOC'96 ThC3.3, 1996) or the like.

As a conventional technology coping with the above problem, as shown in FIG. 26 for example, there has been proposed a configuration in which phases of clock signals each applied on a phase modulator 312 and an intensity modulator 313 which are sequentially connected between a CW light source 311 and an output terminal, are compared with each other by a mixer 314, and a shift amount of a phase shifter 316 is controlled by an automatic delay compensation circuit (ADC) 315 based on a phase comparison result, so that a phase relation between both of the clock signals is held at a fixed value (refer to Japanese Unexamined Patent Publication No. 2002-353896).

However, the conventional technology as described above is a system for directly monitoring the drive signals applied on the plurality of modulators to detect a relative phase relation (differential delay), to thereby perform a feedback control based on a detection result. Therefore, there is a problem in that although the delay deviation at an electric level can be compensated, the delay deviation at an optical level cannot be compensated. For the delay deviation at the optical level, as shown in FIG. 27 for example, there is a problem in that an optical propagation delay amount in a polarization maintaining fiber (PMF) 414 connecting optical modulators 412 and 413 to each other is changed depending on the temperature. FIG. 28 shows one example of a measurement result of a delay amount relative to a temperature change (reference temperature: 25° C.), for a PMF using polyester elastomer as fiber coating. Note, a wavelength of a light is 1550 nm. From the measurement result in FIG. 28, it is understood that the delay amount is increased depending on the temperature rise.

FIG. 29 is a graph rounding up measurement results of temperature dependence of delays caused in various types of PMF and a LN modulator provided with a PMF. From FIG. 29, it is understood that delay variation amounts in PMFs are changed depending on types of PMF coating. To be specific, the delay variation amount of the PMF of 400 µm coating diameter using an ultraviolet curing resin (UV) is smaller that of the PMF of 900 µm coating diameter using polyester elastomer. Further, the delay variation amount in the LN modulator provided with a PMF is larger that of the PMF as a single piece, and a delay amount in the LN modulator itself also has the temperature dependence. As the cause thereof, the thermal expansion of a portion fixing a waveguide substrate and the optical fiber, the thermal expansion of the waveguide length and the like, can be considered.

The next table 1 shows thermal expansion coefficients of an optical fiber core and a coating material, and optical differential delays at the time of temperature variation, which are converted from values of the thermal expansion coefficients.

TABLE 1

| material | thermal expansion coefficient ($\times 10^{-6}$/° c.) | optical differential delay converted value (ps) (length: 0.5 m, temperature difference: 80° c.) |
| --- | --- | --- |
| silica (fiber core) | 0.5 | 0.1 |
| UV curing resin | 50~500 | 10~100 |
| polyester elastomer | 60~95 | 12~19 |
| polyamide | 80~150 | 16~30 |

According to the above table 1, the thermal expansion coefficient of silica (optical fiber core) is significantly small, and a value of optical differential delay occurred depending on the temperature variation of the optical fiber core itself is significantly smaller in comparison with the measurement result shown in FIG. 29. On the other hand, the thermal expansion coefficient of the fiber coating material is large, and a value of optical differential delay occurred depending on the temperature variation of the coating material is larger in comparison with the measurement result shown in FIG. 29. Thus, it can be considered that the thermally expanded fiber coating extends the fiber core, so that as a resultant, an intermediate differential delay is given to the optical signal.

FIG. 30 and FIG. 31 show one example of measurement results of phase shift tolerance between drive signals (data/clock) and received signal waveforms, in the respective optical modulator on a transmission side for the system of CSRZ-DPSK modulation of 43 Gbit/s. Further, FIG. 32 and FIG. 33 show one example of measurement results of phase shift tolerance between drive signals (data/clock) and received signal waveforms, in the respective optical modulators on a reception side, for the system of RZ-DQPSK modulation of 43 Gbit/s.

In the case where the permissible Q penalty is 0.3 dB, the phase shift tolerance is ±2 ps in the CSRZ-DPSK modulation format (FIG. 30), while being ±5 ps in the RZ-DQPSK modulation format (FIG. 32), and accordingly, has a strict value in either of the systems. Therefore, it is understood that if the delay deviation depending on the temperature change of the PMF as shown in FIG. 28 occurs, the delay deviation depending on the temperature change has a value which cannot be neglected, in comparison with the above tolerance, so that the signal deterioration occurs (FIG. 31 and FIG. 33).

Further, not only the temperature variation of delay amount in the PMFs which connect between the plurality of optical modulators but also the temperature variation of delay amount in an electronic circuit or an electric signal transmission path (for example, an electric coaxial cable or the like) is a cause of signal deterioration.

Namely, in an active device and a passive device used for the electronic circuit, characteristics thereof are changed depending on the temperature, and a bias current and a bias voltage in an amplifier using such devices are varied, so that a delay time is changed depending on the temperature. FIG. 34 shows one example of measuring the temperature dependence of the delay amount variation occurring in an electronic integrated circuit (including a clock distribution IC, a logic IC and the like). This example shows a characteristic in that the delay time is increased with the temperature rise.

Further, the delay time in a route through which the electric signal is transmitted is calculated based on a ratio between a square root of effective relative dielectric constant of the route and a velocity of light, and the route length. However, the route length and the effective relative dielectric constant are changed depending on the temperature, and therefore, the delay time of the route is also changed depending on the temperature. To be specific, the effective relative dielectric constant of the route is decided based on a dielectric constant and a shape of dielectrics to be used for the route, and as generally known, the dielectric constant is changed relative to the temperature, and also, the shape itself of the route is also changed depending on the temperature. Therefore, the delay time in the route through which the electric signal is transmitted has the temperature dependence. FIG. 35 shows one example in which the temperature variation of delay time in a high frequency coaxial cable is measured.

Moreover, not only the temperature dependence of delay amount in the PMF, the electronic circuit, or the electric signal transmission path, but also the length of each of the PMFs connecting the plurality of optical modulators is changed due to a mounting arrangement or the splice processing of each optical modulator. Therefore, there is a problem in that the delay deviation occurs between the respective drive signals. Such a problem is hard to be solved by the conventional technology for directly monitoring the delay deviation between the drive signals to be applied on each optical modulator to perform the feedback control.

In addition, in the conventional technology, since an expensive high-speed device is necessary for monitoring the delay deviation, and therefore, there is a drawback of high cost of the optical transmission apparatus.

SUMMARY OF THE INVENTION

The present invention has been accomplished in view of the above problems and has an object to provide an optical transmission apparatus of low cost, capable of reliably compensating for the delay deviation depending on the temperature variation between drive signals for a plurality of optical modulating sections.

In order to achieve the above object, an optical transmission apparatus according to the present invention, which is provided with: a plurality of optical modulating sections that modulates light; a plurality of driving sections that outputs drive signals for driving the optical modulating sections in accordance with modulating signals input thereto; and a delay amount varying section that provides a variable delay amount for at least one modulating signal among the modulating signals respectively input to the plurality of driving sections, to adjust relative timing between the drive signals to be provided respectively for the plurality of optical modulating sections, comprises: at least one temperature monitoring section that monitors the temperature of a portion where a delay amount of an optical signal being propagated or an electric signal being propagated is changed depending on the temperature; and a delay amount control section that controls the delay amount in the delay amount varying section based on the temperature monitored by the temperature monitoring section, so that a differential delay between the drive signals to be provided respectively for the plurality of optical modulating sections is held constant irrespective of the temperature variation.

According to the optical transmission apparatus as described in the above, the drive signals generated in the plurality of driving sections in accordance with the modulating signals are output to the corresponding optical modulating sections. When the optical modulation is performed in each of the optical modulating sections, the temperature of the portion where the delay amount of the optical signal or the electric signal being propagated through the optical transmission apparatus is changed depending on the temperature, is monitored by the monitoring section, and a monitoring result thereof is transmitted to the delay amount control section. Then, the delay amount in the delay amount varying section is optimized by the delay amount control section based on the temperature from the temperature monitoring section, so that the differential delay between the drive signals to be provided for the respective optical modulating sections is held constant irrespective of the temperature variation. As a result, even if the temperature is changed, the drive signals are provided at appropriate timing for the respective optical modulating sections, and therefore, it becomes possible to prevent signal deterioration due to the delay deviation between the drive signals.

As described above, according to the present invention, even in the case where an optical signal at high bit rate of 40 Gbit/s or the like is transmitted in a modulation format using a plurality of optical modulators, it becomes possible to provide the optical transmission apparatus at low cost, capable of stably transmitting an optical signal of high quality, without an influence of the temperature variation in the apparatus.

Other objects, features and advantages of the present invention will become apparent from the following explanation of the embodiments, in conjunction with the appended drawings.

DESCRIPTION OF THE PREFERRED EMBODIMENTS

Figure 1:
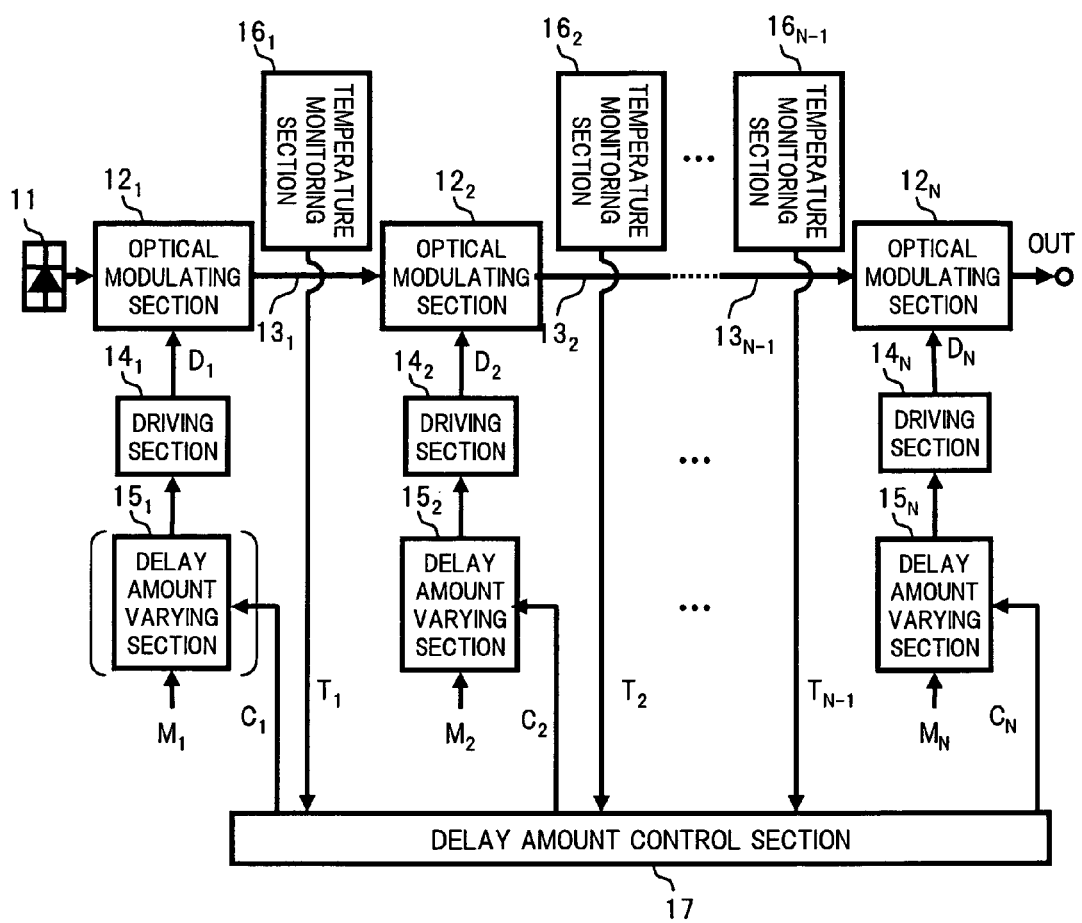
FIG. 1 is a block diagram showing a configuration of a first embodiment of an optical transmission apparatus according to the present invention.

There will be described embodiments for implementing the present invention, with reference to the accompanying drawings. The same reference numerals denote the same or equivalent parts in all drawings.

FIG. 1 is a block diagram showing a configuration of a first embodiment of an optical transmission apparatus according to the present invention.

In FIG. 1, the present optical transmission apparatus is one example in which the present invention is applied to the case where a plurality (here, N) of optical modulating sections $12_1$ to $12_N$ are serially arranged between a CW light source 11 and an output port OUT, as in a (CS)RZ-DPSK modulation format or a (CS)RZ modulation format.

For each of the optical modulating sections $12_1$ to $12_N$, an individually separate optical modulator, such as, a phase modulator, an intensity modulator or the like, is used, and input/output ports of the respective optical modulating sections $12_1$ to $12_N$ are serially connected to each other via optical fibers $13_1$, to $13_{N-1}$. To the optical modulating sections $12_1$ to $12_N$, driving sections $14_1$, to $14_N$ corresponding thereto are disposed, and the optical modulating sections $12_1$ to $12_N$ are modulation driven by drive signals $D_1$ to $D_N$ output from the driving sections $14_1$ to $14_N$.

The driving sections $14_1$ to $14_N$ respectively receive modulating signals $M_1$ to $M_N$ such as data of required bit rate or clocks corresponding thereto, via delay amount varying sections $15_1$ to $15_N$ to output the drive signals $D_1$ to $D_N$ respectively generated based on the modulating signals $M_1$ to $M_N$, to the optical modulating sections $12_1$ to $12_N$.

The delay amount varying sections $15_1$ to $15_N$ respectively provide variable delay amounts for the modulating signals $M_1$ to $M_N$ to be input to the respective driving sections $14_1$ to $14_N$. The delay amounts in the respective delay amount varying sections $15_1$ to $15_N$ are respectively controlled in accordance with control signals $C_1$ to $C_N$ generated in a delay amount control section 17 based on temperature monitor signals $T_1$ to $T_{N-1}$ output from temperature monitoring sections $16_1$ to $16_{N-1}$ The temperature monitoring sections $16_1$ to $16_{N-1}$ are respectively disposed in the vicinity of or positions in contact with the optical fibers $13_1$ to $13_{N-1}$ which connect between the optical modulating sections $12_1$ to $12_N$, to monitor the temperatures of the optical fibers $13_1$ to $13_{N-1}$.

The delay amount control section 17 computes correction values of the delay amounts in the delay amount varying sections $15_1$ to $15_N$ based on the temperature monitor signals $T_1$ to $T_{N-1}$ from the respective temperature monitoring sections $16_1$ to $16_{N-1}$, so that differential delays among the drive signals $D_1$ to $D_N$ to be provided respectively for the optical modulating sections $12_1$ to $12_N$ are held constant, to output control signals $C_1$ to $C_N$ indicating computation results thereof.

Figure 28:
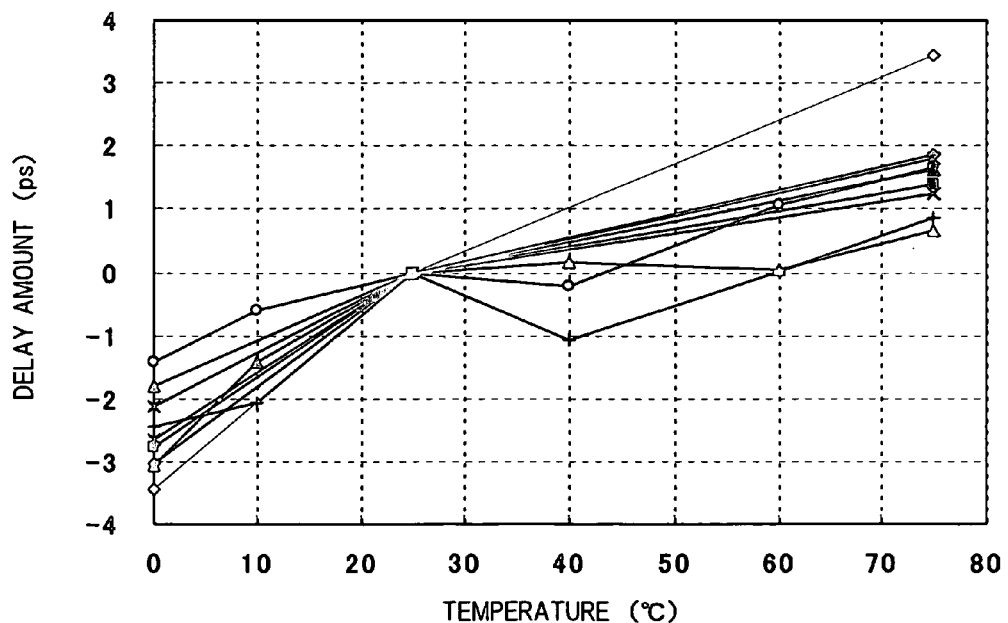
FIG. 28 is a graph showing the temperature dependence of the delay amount in the PMF.
Figure 29:
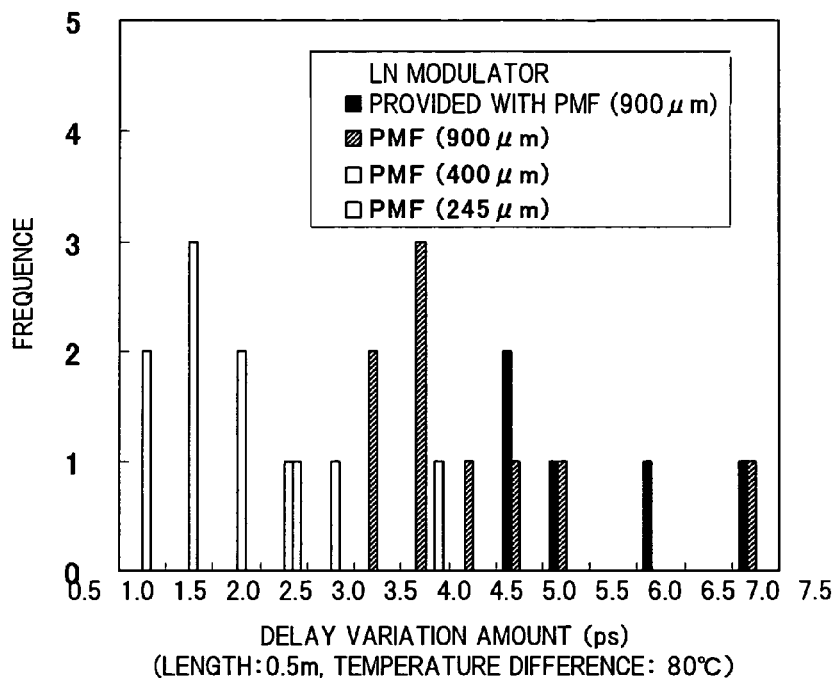
FIG. 29 is a graph showing the temperature dependence of delay amount in different types of PMFs.
Figure 30:
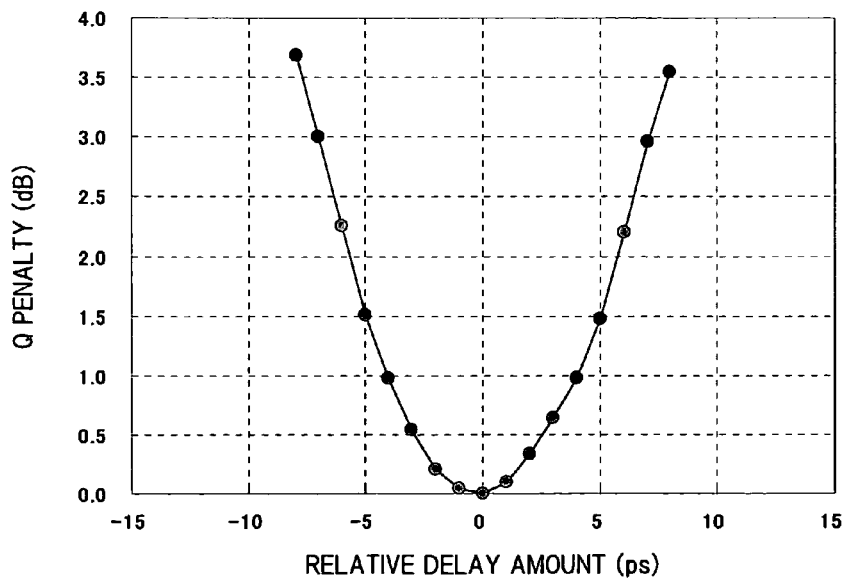
FIG. 30 is a graph showing measurement results of phase shift tolerance between data/clocks in the conventional CSRZ-DPSK modulation format.
Figure 31:
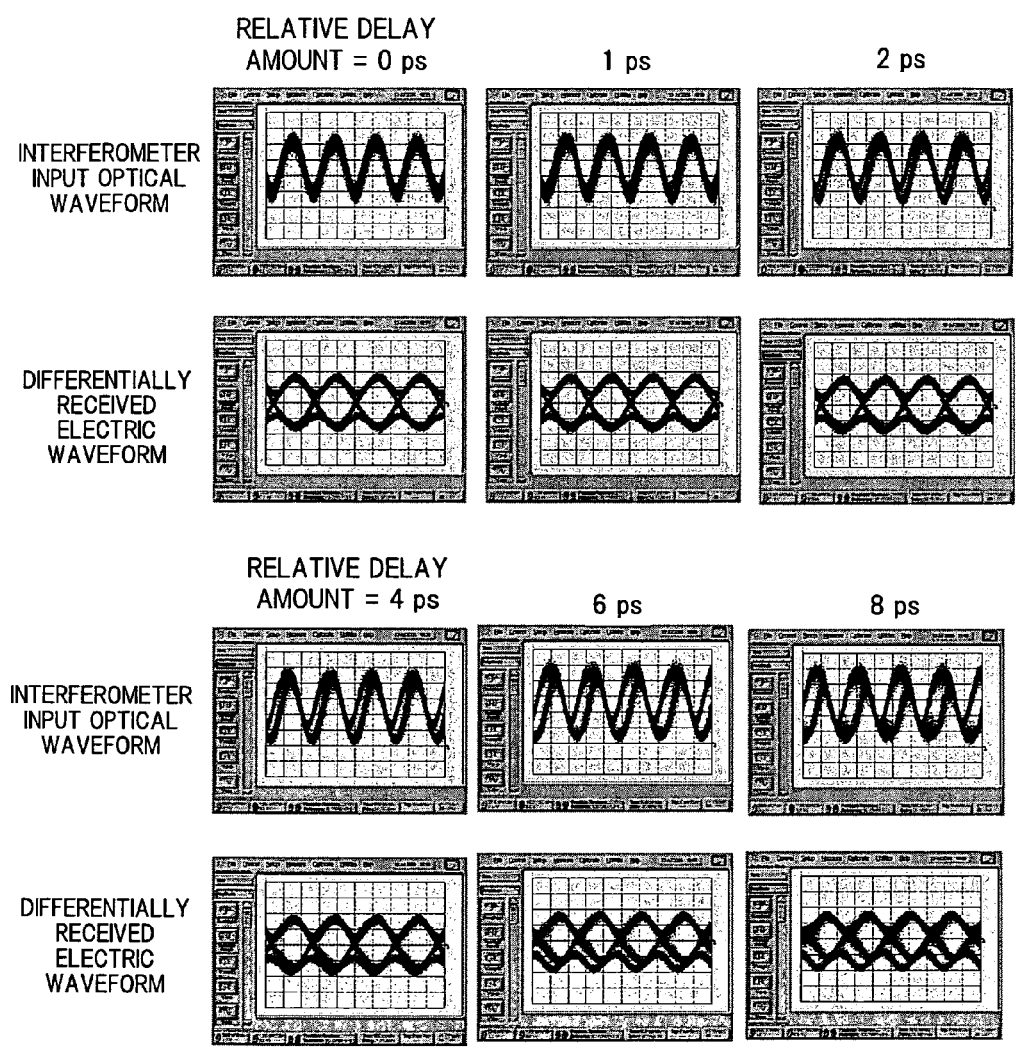
FIG. 31 is a diagram showing signal waveforms in the conventional CSRZ-DPSK modulation format.
Figure 32:
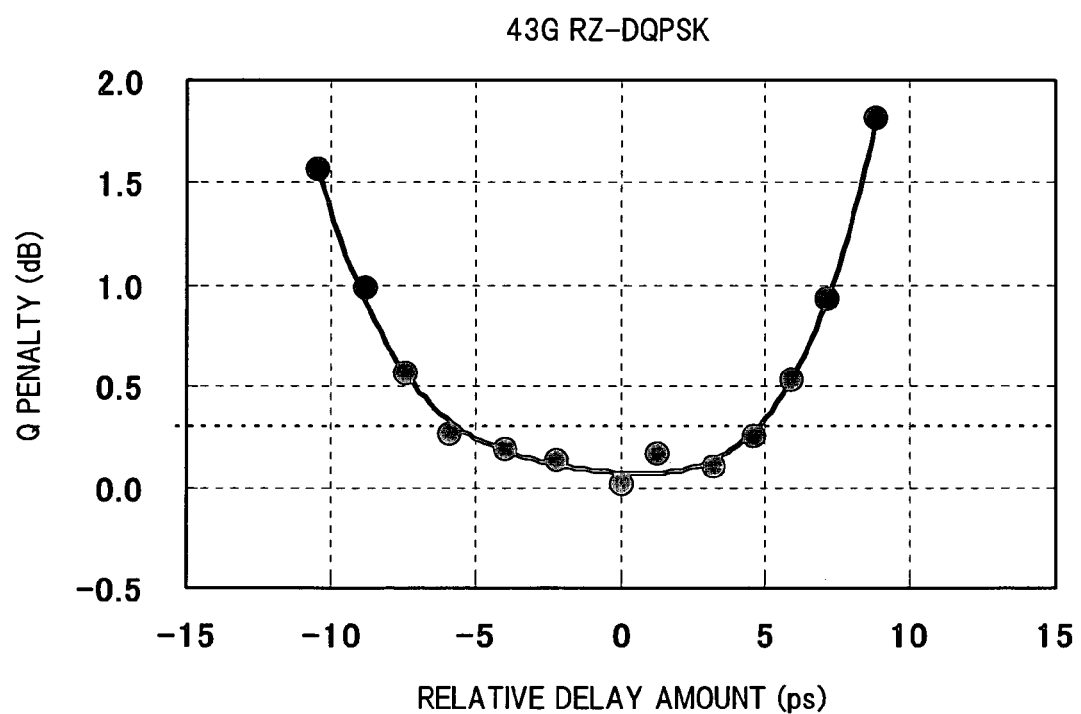
FIG. 32 is a graph showing measurement results of phase shift tolerance between data/clocks in the conventional RZ-DQPSK modulation format.
Figure 33:
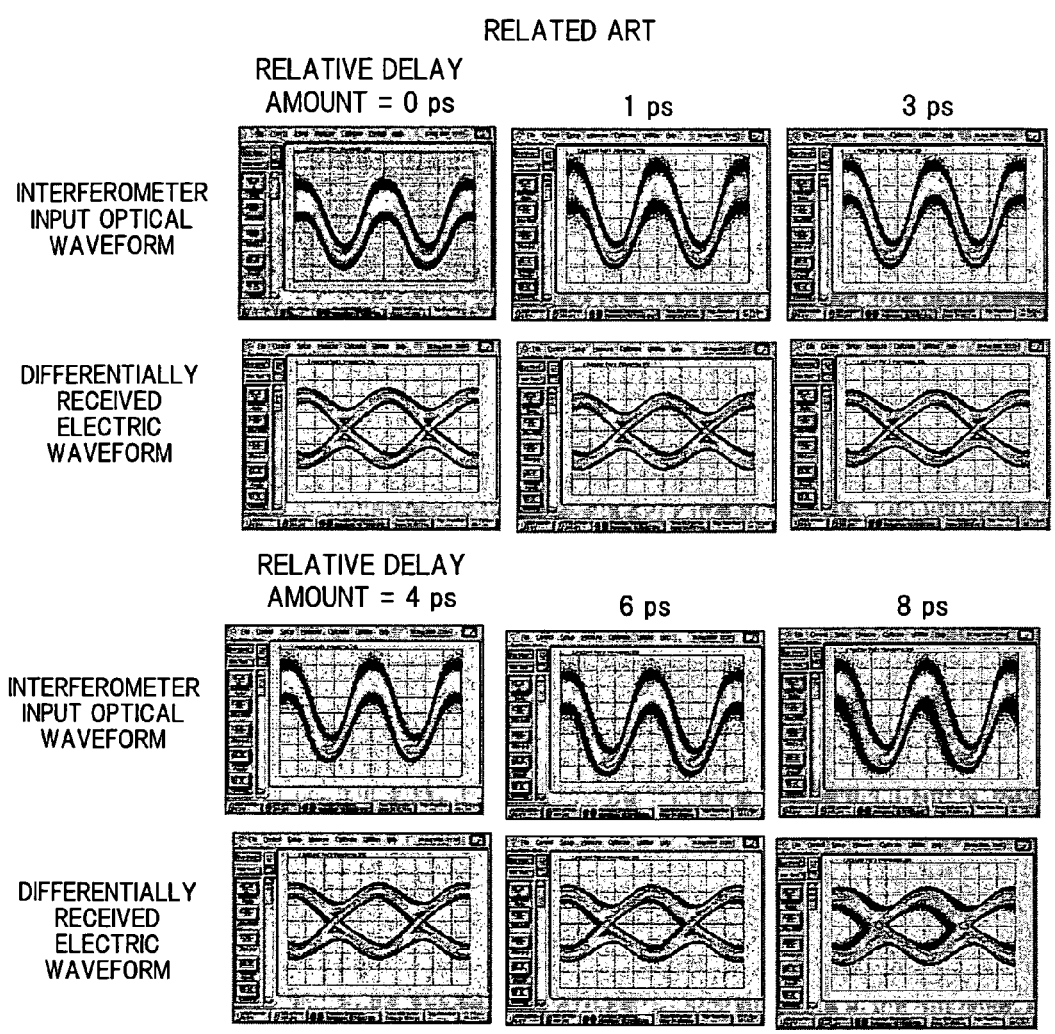
FIG. 33 is a diagram showing signal waveforms in the conventional RZ-DQPSK modulation format.
Figure 34:
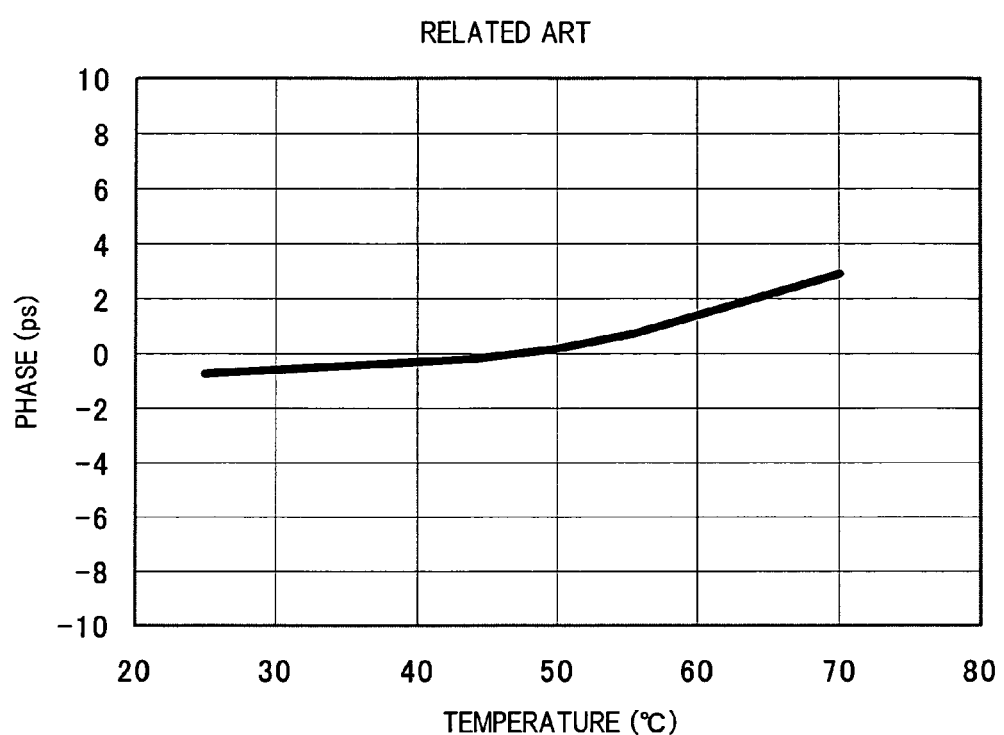
FIG. 34 is a graph showing measurement results of temperature dependence of delay amount in an electronic integrated circuit.
Figure 35:
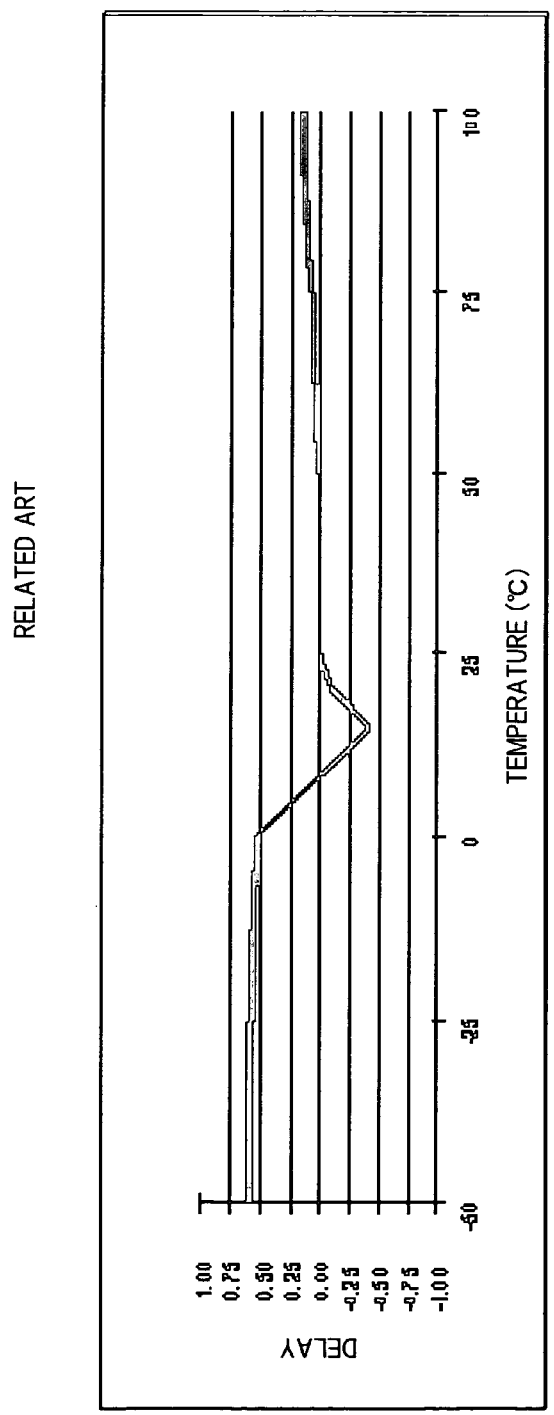
FIG. 35 is a graph showing measurement results of temperature dependence of delay time in a high frequency coaxial cable.

In the optical transmission apparatus having the above configuration, a continuous light output from the CW light source 11 is sequentially modulated in the respective optical modulating sections $12_1$ to $12_N$, to be output to the outside via the output port OUT. At this time, if the temperature variation occurs in each of the optical fibers $13_1$ to $13_{N-1}$ connecting the optical modulating sections $12_1$ to $12_N$, similarly to the case of a polarization maintaining fiber (PMF) exemplary shown in FIG. 28 and FIG. 29, the delay amounts in optical signals propagated through the respective optical fibers $13_1$ to $13_{N-1}$ are changed, resulting in the signal deterioration due to the delay deviation unless the differential delays among the drive signals $D_1$ to $D_N$ to be provided for the optical modulating sections $12_1$ to $12_N$ are optimized (refer to FIG. 30 and FIG. 32).

In order to prevent the signal deterioration according to the temperature variation of the delay amounts in the optical fibers $13_1$ to $13_{N-1}$, in the present embodiment, the temperature monitoring sections $16_1$ to $16_{N-1}$ are respectively disposed corresponding to the optical fibers $13_1$ to $13_{N-1}$, so that the temperatures of the optical fibers $13_1$ to $13_{N-1}$ are monitored. Then, the temperature monitor signals $T_1$ to $T_{N-1}$ output from the temperature monitoring sections $16_1$ to $16_{N-1}$ are provided for the delay amount control section 17, so that the correction values of the delay amounts in the delay amount varying sections $15_1$ to $15_N$ are computed based on the temperature monitor signals $T_1$ to $T_{N-1}$, and the temperature compensation of the delay deviation is performed.

The computation of the correction values of the delay amounts is performed in the delay amount control section 17, by utilizing for example temperature characteristic data of the delay amounts in the optical fibers $13_1$ to $13_{N-1}$ to obtain the delay amounts corresponding to the temperatures of the optical fibers, which are monitored by the temperature monitoring sections $16_1$ to $16_{N-1}$, to thereby calculate the correction values of the delay amounts in the delay amount varying sections $15_1$ to $15_N$ necessary for compensating for the differential delays among the drive signals, which occur depending on the temperature variation of the delay amounts. Further, it is also possible to calculate the differential delays corresponding to the temperatures of the optical fibers, which are monitored by the temperature monitoring sections $16_1$ to $16_{N-1}$, using a relational expression which represents the differential delays among the drive signals as a temperature function, in place of the utilization of the temperature characteristic data of the delay amounts in the optical fibers $13_1$ to $13_{N-1}$. Note, specific examples of the computation processing in the delay amount control section 17 will be described later in detail.

When the correction values of the delay amounts corresponding to the temperatures of the optical fibers $13_1$ to $13_{N-1}$ are computed for the delay amount varying sections $15_1$ to $15_N$ as in the above manner, the control signals $C_1$ to $C_N$ indicating the computation results thereof are output from the delay amount control section 17 to the respective delay amount varying sections $15_1$ to $15_N$, so that the delay amounts in the delay amount varying sections $15_1$ to $15_N$ are controlled in accordance with the control signals $C_1$ to $C_N$. As a result, the differential delays among the drive signals $D_1$ to $D_N$ output from the driving sections $14_1$ to $14_N$ to the optical modulating sections $12_1$ to $12_N$ are controlled to be constant irrespective of the temperature variation, and therefore, it becomes possible to prevent the signal deterioration caused by the temperature dependence of the delay amounts in the optical fibers $13_1$ to $13_{N-1}$. Further, in the present optical transmission apparatus, since timing controls of the drive signals $D_1$ to $D_N$ are performed based on the temperature monitoring results, it is possible to realize the optical transmission apparatus of low cost without the necessity of directly monitoring the drive signals using an expensive high-speed device, differently from the conventional technology.

Incidentally, in the first embodiment, the delay amount varying sections are disposed corresponding to all of the plurality of optical modulating sections. However, in the temperature compensation of the delay deviation, relative timing between the drive signals to be provided for the optical modulating sections may be optimized. Therefore, for example, if the drive signal $D_1$ output from the driving section $14_1$ is made a reference and the differential delays among the remaining drive signals $D_2$ to $D_N$ are optimized, the delay amount varying section $15_1$ can be omitted.

Further, in the first embodiment, the configuration example is shown in which the temperature monitoring sections $16_1$ to $16_{N-1}$ are arranged for the respective optical fibers $13_1$ to $13_{N-1}$ which connect between the plurality of optical modulating sections. However, the temperature monitoring sections need not necessarily to be disposed corresponding to all of the optical fibers, and may be arranged on appropriate positions in view of the temperature distribution or the like in the optical transmission apparatus.

Next, there will be described a second embodiment of the optical transmission apparatus according to the present invention.

Figure 2:
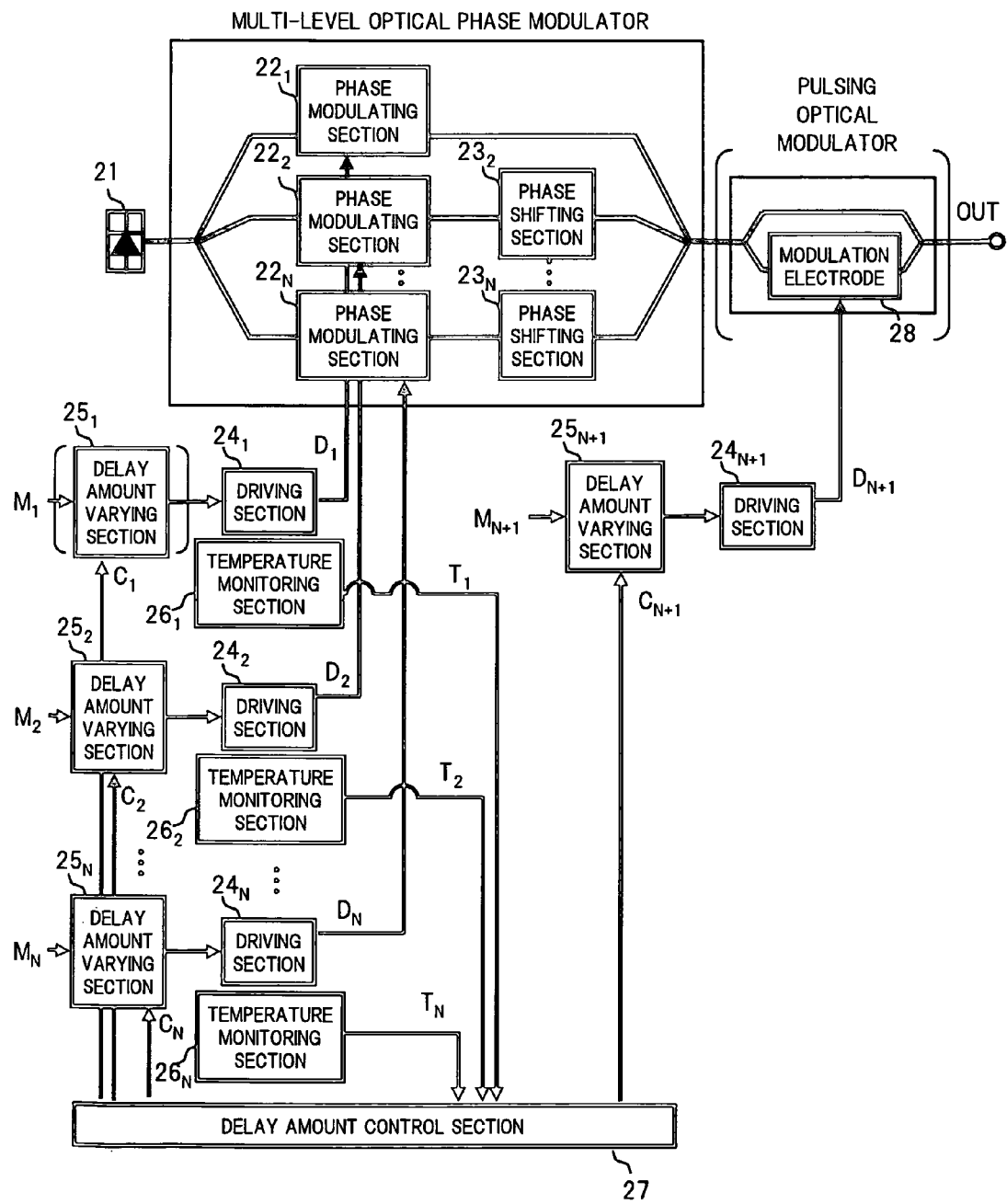
FIG. 2 is a block diagram showing a configuration of a second embodiment of the optical transmission apparatus according to the present invention.

FIG. 2 is a block diagram showing a configuration of the optical transmission apparatus according to the second embodiment.

In FIG. 2, the present optical transmission apparatus is one example in which the present invention is applied to the case where a multi-level optical phase modulator and a pulsing optical modulator are serially arranged between a CW light source 21 and an output port OUT, and also, a plurality (here, N) of phase modulating sections $22_1$ to $22_N$ are arranged in parallel inside of the multi-level optical phase modulator, so that lights phase modulated by the respective phase modulating sections $22_1$ to $22_N$ are multiplexed with each other, and a 2N-level phase modulated optical signal is transmitted, as in a (CS)RZ-DQPSK modulation format. To the respective phase modulating sections $22_1$ to $22_N$, driving sections $24_1$ to $24_N$ corresponding thereto are disposed, so that the phase modulating sections $22_1$ to $22_N$ are driven in accordance with drive signals $D_1$ to $D_N$ output from the respective driving sections $24_1$ to $24_N$. Incidentally, optical signals phase modulated by the respective phase modulating sections $22_2$ to $22_N$ are phase shifted by respective phase shifting sections $23_2$ to $23_N$ and thereafter, are multiplexed with an optical signal phase modulated by the phase modulating section $22_1$.

Similarly to the driving sections $14_1$ to $14_N$ in the first embodiment, the driving sections $24_1$ to $24_N$ respectively receive modulating signals $M_1$ to $M_N$ via delay amount varying sections $25_1$ to $25_N$, to output the drive signals $D_1$ to $D_N$ respectively generated based on the modulating signals $M_1$ to $M_N$, to the phase modulating sections $22_1$ to $22_N$.

The delay amount varying sections $25_1$ to $25_N$ respectively provide variable delay amounts for the modulating signals $M_1$ to $M_N$ to be input to the respective driving sections $24_1$ to $24_N$. The delay amounts in the respective delay amount varying sections $25_1$ to $25_N$ are respectively controlled in accordance with control signals $C_1$ to $C_N$ generated in a delay amount control section 27 based on temperature monitor signals $T_1$ to $T_N$ output from temperature monitoring sections $26_1$ to $26_N$. Note, to the pulsing optical modulator connected to the latter stage of the multi-level optical phase modulator, there are disposed a driving section $24_{N+1}$ that outputs a drive signal $D_{N+1}$ to be applied on a modulation electrode 28 and a delay amount varying section $25_{N+1}$ that provides a variable delay amount for a modulating signal $M_{N+1}$ to be input to the driving section $24_{N+1}$.

The temperature monitoring sections $26_1$ to $26_N$ are respectively arranged in the vicinity of electronic circuit sections including the driving sections $24_1$ to $24_N$ and the delay amount varying sections $25_1$ to $25_N$, to monitor the temperatures of the electronic circuit sections.

The delay amount control section 27 computes correction values of the delay amounts in the delay amount varying sections $25_1$ to $25_{N+1}$ based on the temperature monitor signals $T_1$ to $T_N$ from the respective temperature monitoring sections $26_1$ to $26_N$, so that differential delays among the drive signals $D_1$ to $D_{N+1}$ to be provided for the phase modulating sections $22_1$ to $22_N$ and for the modulation electrode 28 of the pulsing optical modulator are held constant irrespective of the temperature variation, to output control signals $C_1$ to $C_{N+1}$ indicating computation results thereof.

In the optical transmission apparatus of the above configuration, a continuous light output from the CW light source 21 is input to the multi-level optical phase modulator to be branched into N lights, and thereafter, the N lights are phase modulated respectively by the phase modulating sections $22_1$ to $22_N$. In the optical signals output from the phase modulating sections $22_1$ to $22_N$, the optical signals from the phase modulating sections $22_2$ to $22_N$ are phase shifted by the phase shifting sections $23_2$ to $23_N$, and thereafter, are multiplexed with each other, so that the 2N-level phase modulated optical signal is sent to the pulsing optical modulator. In the pulsing optical modulator, the 2N-level phase modulated optical signal is intensity modulated, so that a pulsed optical signal is generated to be output to the outside via the output port OUT.

When the modulating operation is performed in the multi-level optical phase modulator, if the temperature variation occurs in each of the electronic circuit sections including the driving sections $24_1$ to $24_N$ and the delay amount varying sections $25_1$ to $25_N$, as described in the above, characteristics of active devices and passive devices used for the respective electronic circuits constituting the driving sections $24_1$ to $24_N$ and the delay amount varying sections $25_1$ to $25_N$ or delay amounts in electric signal transmission paths connected to the electronic circuits are changed, resulting in the signal deterioration due to the delay deviation unless the differential delays among the drive signals $D_1$ to $D_N$ to be provided for the phase modulating sections $22_1$ to $22_N$ are optimized. Therefore, in the present embodiment, the temperature monitoring sections $26_1$ to $26_N$ are disposed in the vicinity of the electronic circuit sections corresponding to the respective phase modulating sections $22_1$ to $22_N$, so that the temperatures of the electronic circuit sections are monitored. Then, the temperature monitor signals $T_1$ to $T_N$ output from the temperature monitoring sections $26_1$ to $26_N$ are provided for the delay amount control section 27, so that the correction values of the delay amounts in the delay amount varying sections $25_1$ to $25_N$ are computed based on the temperature monitor signals $T_1$ to $T_N$, and the temperature compensation of the delay deviation is performed, similarly to the first embodiment. As a result, the differential delays among the drive signals $D_1$ to $D_N$ output from the driving sections $24_1$ to $24_N$ to the phase modulating sections $22_1$ to $22_N$ are controlled to be constant irrespective of the temperature variation, and therefore, it becomes possible to prevent the signal deterioration caused by the temperature dependence of each of the electronic circuit sections corresponding to the respective phase modulating sections $22_1$ to $22_N$. Since such a configuration does not need any expensive high-speed device, differently from the conventional technology, it becomes possible to achieve the cost reduction of the optical transmission apparatus.

Incidentally, herein, it is assumed that the correction value of the delay amount in the delay amount varying section $25_{N+1}$ on the pulsing optical modulator side is also computed by the delay amount control section 27 based on the temperature monitor signals $T_1$ to $T_N$. Further, in the case where the multi-level optical phase modulator and the pulsing optical modulator are connected to each other via an optical fiber, it is desirable to compensate for the delay deviation according to the temperature variation in the optical fiber, similarly to the first embodiment.

Also in the second embodiment, similarly to the first embodiment, it is not necessary to dispose the delay amount varying sections corresponding to all of the plurality of phase modulating sections. For example, in FIG. 2, if the drive signal $D_1$ output from the driving section $24_1$ is made a reference and the differential delays among the remaining drive signals $D_2$ to $D_N$ are optimized, the delay amount varying section $25_1$ can be omitted. Further, the second embodiment can cope with a modulation format in which a multi-level optical phase modulated optical signal is output without being pulsed, and in such a case, the pulsing optical modulator is omitted.

In addition, in the second embodiment, the configuration example is shown in which the temperature monitoring sections $26_1$ to $26_N$ are arranged for the electronic circuit sections corresponding to the respective phase modulating sections $22_1$ to $22_N$. However, the temperature monitoring sections need not necessarily to be disposed corresponding to all of the electronic circuit sections, and may be arranged on appropriate positions in view of the temperature distribution or the like in the optical transmission apparatus.

Next, there will be described a third embodiment of the optical transmission apparatus according to the present invention.

Figure 3:
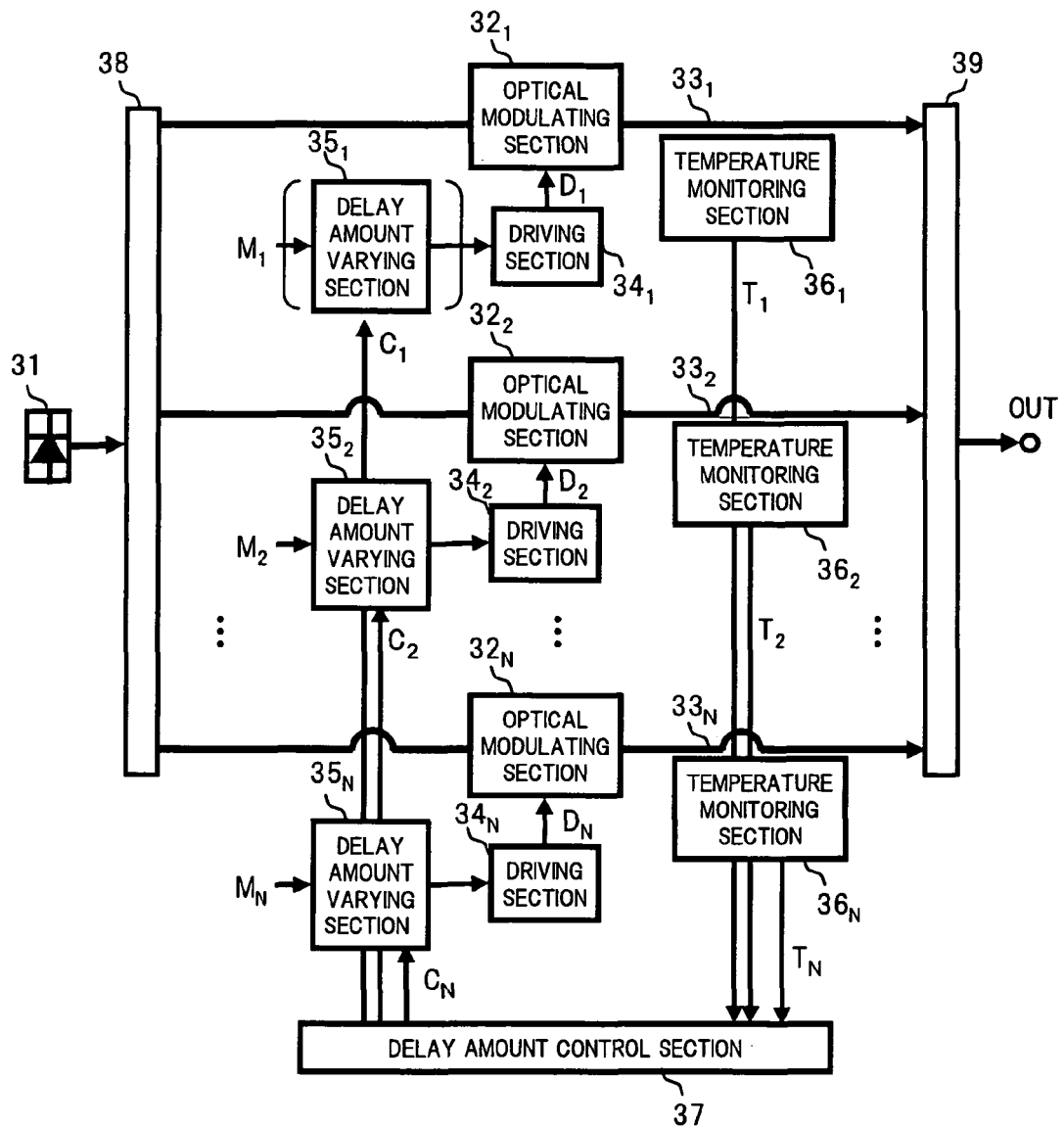
FIG. 3 is a block diagram showing a configuration of a third embodiment of the optical transmission apparatus according to the present invention.

FIG. 3 is a block diagram showing a configuration of the optical transmission apparatus according to the third embodiment.

In FIG. 3, the present optical transmission apparatus is one example in which the present invention is applied to the case where a plurality (here, N) of optical modulating sections $32_1$ to $32_N$ are arranged in parallel, and the intensity modulation is performed in each of the optical modulating sections $32_1$ to $32_N$, so that intensity modulated optical signals are multiplexed with each other, to be subjected to the optical time division multiplexing (OTDM) modulation. N lights obtained by branching a continuous light from a CW light source 31 into N by an optical branching device 38, are input to the respective optical modulating sections $32_1$ to $32_N$, and the intensity modulated optical signals output from the respective optical modulating sections $32_1$ to $32_N$ are sent to an optical multiplexer 39 via respective optical fibers $33_1$ to $33_N$ and are multiplexed with each other by the optical multiplexer 39, to be output to the outside via the output port OUT. To the respective optical modulating sections $32_1$ to $32_N$, driving sections $34_1$ to $34_N$ corresponding thereto are disposed, so that the optical modulating sections $32_1$ to $32_N$ are driven in accordance with drive signals $D_1$ to $D_N$ output from the respective driving sections $34_1$ to $34_N$.

Similarly to the driving sections $14_1$ to $14_N$ in the first embodiment, the driving sections $34_1$ to $34_N$ respectively receive modulating signals $M_1$ to $M_N$ via delay amount varying sections $35_1$ to $35_N$, to output the drive signals $D_1$ to $D_N$ respectively generated based on the modulating signals $M_1$ to $M_N$, to the optical modulating sections $32_1$ to $32_N$.

The delay amount varying sections $35_1$ to $35_N$ respectively provide variable delay amounts for the modulating signals $M_1$ to $M_N$ to be input to the respective driving sections $34_1$ to $34_N$. The delay amounts in the respective delay amount varying sections $35_1$ to $35_N$ are controlled in accordance with control signals $C_1$ to $C_N$ generated in a delay amount control section 37 based on temperature monitor signals $T_1$ to $T_N$ output from temperature monitoring sections $36_1$ to $36_N$.

The temperature monitoring sections $36_1$ to $36_N$ are respectively disposed in the vicinity of or positions in contact with the optical fibers $33_1$ to $33_N$ which connect between the optical modulating sections $32_1$ to $32_N$ and the optical multiplexer 39, to monitor the temperatures of the optical fibers $33_1$ to $33_N$.

The delay amount control section 37 computes correction values of the delay amounts in the delay amount varying sections $35_1$ to $35_N$ based on the temperature monitor signals $T_1$ to $T_N$ from the respective temperature monitoring sections $36_1$ to $36_N$ so that differential delays among the drive signals $D_1$ to $D_N$ to be provided for the optical modulating sections $32_1$ to $32_N$ are held constant, to output control signals $C_1$ to $C_N$ indicating computation results thereof.

In the optical transmission apparatus having the above configuration, the continuous light output from the CW light source 31 is branched into N by the optical branching device 38, and thereafter, N branched lights are intensity modulated respectively in time division in the respective optical modulating sections $32_1$ to $32_N$. The optical signals output from the optical modulating sections $32_1$ to $32_N$ are propagated through the corresponding optical fibers $33_1$ to $33_N$ to be multiplexed with each other by the optical multiplexer 39, and a time division multiplexed optical signal is output to the outside via the output port OUT.

At this time, if the temperature variation occurs in each of the optical fibers $33_1$ to $33_N$ through which the output lights from the optical modulating sections $32_1$ to $32_N$ are propagated, delay amounts in the optical signals propagated through the optical fibers $33_1$ to $33_N$ are changed, so that the respective optical signals are not multiplexed with each other at proper timing, resulting in the deterioration of the time division multiplexed light, unless the differential delays among the drive signals $D_1$ to $D_N$ to be provided for the optical modulating sections $32_1$ to $32_N$ are optimized. Therefore, in the present embodiment, the temperature monitoring sections $36_1$ to $36_N$ are respectively disposed corresponding to the optical fibers $33_1$ to $33_N$, so that the temperatures of the optical fibers $33_1$ to $33_N$ are monitored. Then, the temperature monitor signals $T_1$ to $T_N$ output from the temperature monitoring sections $36_1$ to $36_N$ are provided for the delay amount control section 37, SO that the correction values of the delay amounts in the delay amount varying sections $35_1$ to $35_N$ are computed based on the temperature monitor signals $T_1$ to $T_N$, and the temperature compensation of the delay deviation is performed, similarly to the first embodiment. As a result, output timing of each of the drive signals $D_1$ to $D_N$ from the driving sections $34_1$ to $34_N$ to the optical modulating sections $32_1$ to $32_N$ is controlled to be constant irrespective of the temperature variation, and therefore, it becomes possible to prevent the deterioration of the time division multiplexed light caused by the temperature dependence of each of the delay amounts in the optical fibers $33_1$ to $33_N$. Since such a configuration does not need any expensive high-speed device differently from the conventional technology, it is possible to achieve the cost reduction of the optical transmission apparatus.

Also in the third embodiment, similarly to the first embodiment, it is not necessary to dispose the delay amount varying sections corresponding to all of the plurality of optical modulating sections. For example, in FIG. 3, if the drive signal $D_1$ output from the driving section $34_1$ is made a reference and the differential delays among the remaining drive signals $D_2$ to $D_N$ are optimized, the delay amount varying section $35_1$ can be omitted. Further, the temperature monitoring sections need not necessarily to be disposed corresponding to all of the optical fibers, and may be arranged on appropriate positions in view of the temperature distribution or the like in the optical transmission apparatus.

Next, there will be described a fourth embodiment of the optical transmission apparatus according to the present invention.

Figure 4:
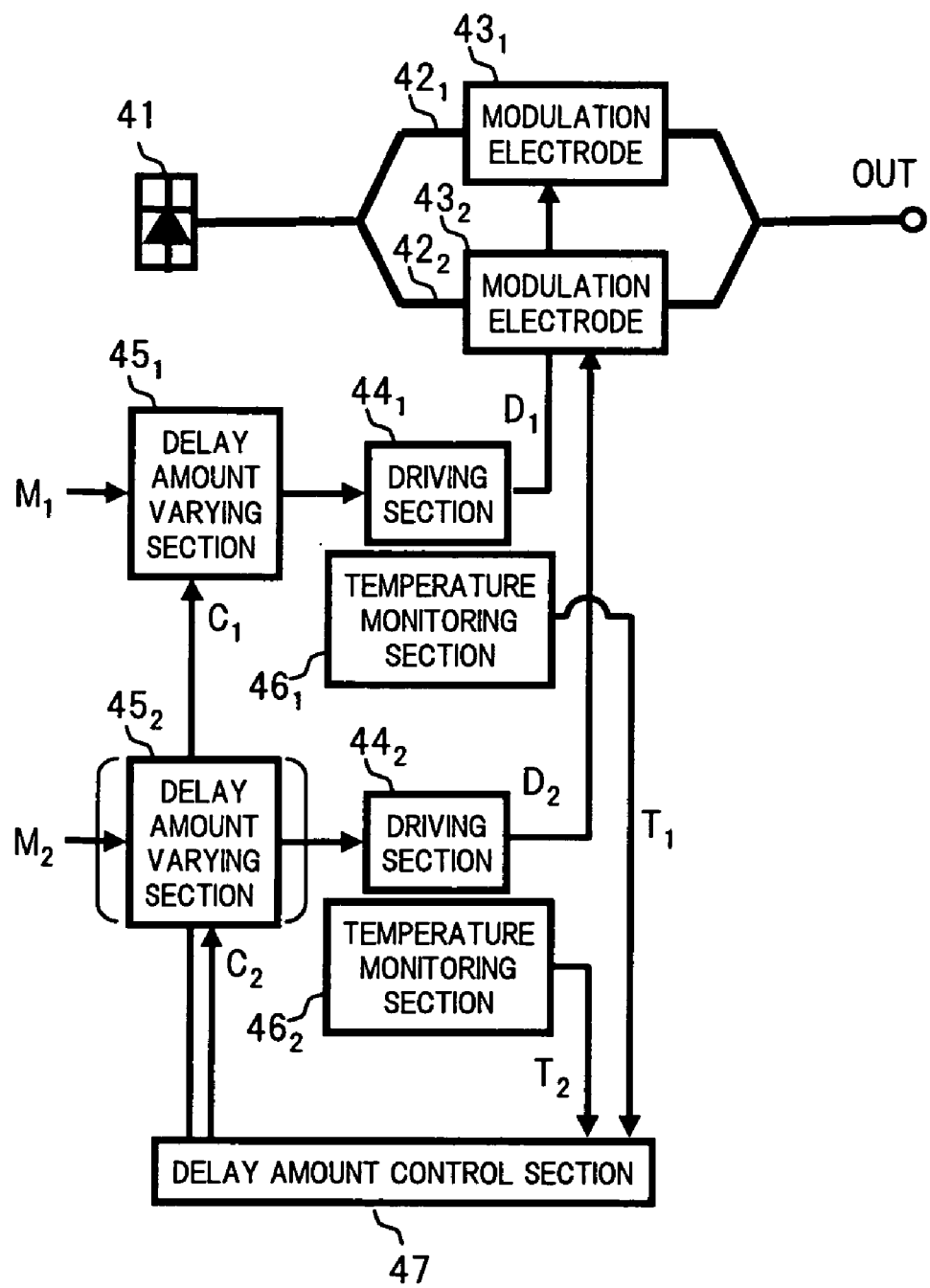
FIG. 4 is a block diagram showing a configuration of a fourth embodiment of the optical transmission apparatus according to the present invention.

FIG. 4 is a block diagram showing a configuration of the optical transmission apparatus according to the fourth embodiment.

In FIG. 4, the present optical transmission apparatus is one example in which the present invention is applied to the case where a double-side driving modulator is used. The double-side driving modulator, in for example a NRZ modulation format or a (CS)RZ modulation format, can generate a modulating signal in which wavelength variation (chirping) in a bit is zero, by applying a forward signal and an inverse signal on each of modulation electrodes $43_1$ and $43_2$ respectively formed on branching waveguides $42_1$ and $42_2$ of a Mach-Zehnder interferometer to push/pull drive the modulation electrodes $43_1$ and $43_2$. In such a double-side driving modulator, it can be deemed that an optical modulating section consisting of the branching waveguide $42_1$ and the modulation electrode $43_1$, and an optical modulating section consisting of the branching waveguide $42_2$ and the modulation electrode $43_2$, are connected in parallel to each other. Accordingly, the present invention can be effectively applied in order to compensate for the delay deviation depending on the temperature variation in drive signals to be provided for the modulation electrodes $43_1$ and $43_2$.

To be specific, to driving sections $44_1$ and $44_2$ corresponding to the respective modulation electrodes $43_1$ and $43_2$, there are disposed delay amount varying sections $45_1$ and $45_2$ that provide variable delay amounts for modulating signals $M_1$ and $M_2$ input thereto. Incidentally, it is also possible to omit either one of the delay amount varying sections $45_1$ and $45_2$. Further, temperature monitoring sections $46_1$ and $46_2$ are arranged in the vicinity of electronic circuit sections including the driving sections $44_1$ and $44_2$ and the delay amount varying sections $45_1$ and $45_2$, to monitor the temperatures of the electronic circuit sections. Then, correction values of the delay amounts in the delay amount varying sections $45_1$ and $45_2$ are computed by a delay amount control section 47 based on temperature monitor signals $T_1$ and $T_2$ output from the temperature monitoring sections $46_1$ and $46_2$, to thereby compensate for the delay deviation depending on the temperature variation. As a result, it becomes possible to optimize a phase relation between drive signals $D_1$ and $D_2$ to be provided for the modulation electrodes $43_1$ and $43_2$ irrespective of the temperature variation.

Next, there will be described a fifth embodiment of the optical transmission apparatus according to the present invention. In the first embodiment, the configuration has been described in which the individually separate plural optical modulating sections (optical modulators) are serially connected to each other using the optical fibers. In the fifth embodiment, there will be described a modified example in which the present invention is applied to the case of using an integrated optical modulator in which a plurality of optical modulating sections each having a function same as that of the optical modulating section in the first embodiment, is collectively formed on one waveguide substrate.

Figure 5:
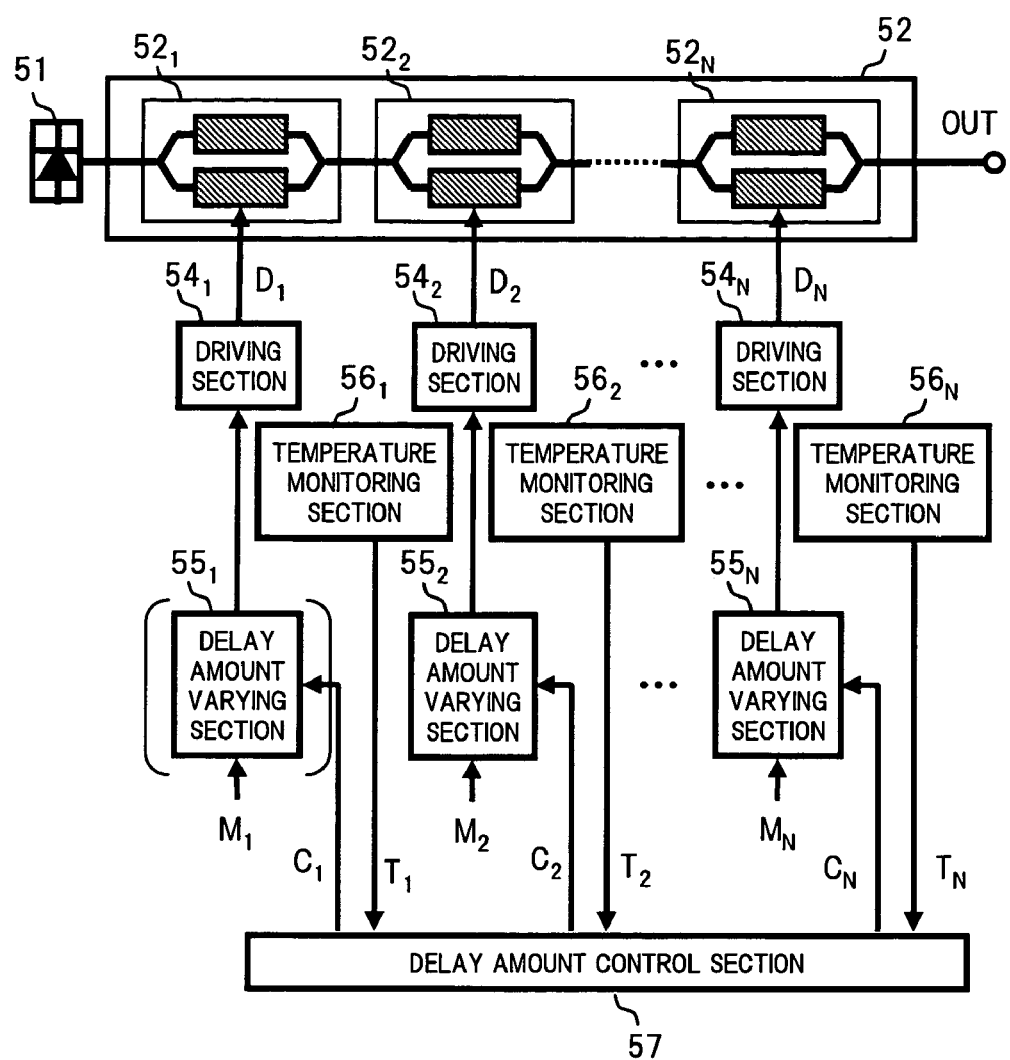
FIG. 5 is a block diagram showing a configuration of a fifth embodiment of the optical transmission apparatus according to the present invention.

FIG. 5 is a block diagram showing a configuration of the optical transmission apparatus according to the fifth embodiment.

In FIG. 5, in the present optical transmission apparatus, a waveguide substrate 52 is disposed between a CW light source 51 and an output port OUT, and on the waveguide substrate 52, a serially arranged plurality (here, N) of optical modulating sections $52_1$ to $52_N$ is formed. Herein, since the respective optical modulating sections $52_1$ to $52_N$ are connected to each other by the waveguide, there is no delay deviation depending on the temperature variation in each of the optical fibers which connect between the optical modulating sections. On the other hand, for electronic circuit sections including driving sections $54_1$ to $54_N$ and delay amount varying sections $55_1$ to $55_N$, which are disposed corresponding to the optical modulating sections $52_1$ to $52_N$, similarly to the second embodiment, there is a possibility that characteristics of active devices and passive devices used for the respective electronic circuit sections or the delay amounts in the electric signal transmission paths are changed depending on the temperature, resulting in the delay deviation among drive signals $D_1$ to $D_N$ to be provided for the optical modulating sections $52_1$ to $52_N$. In order to avoid such a possibility, here, temperature monitoring sections $56_1$ to $56_N$ are arranged in the vicinity of the electronic circuit sections, to thereby monitor the temperature of each of the electronic circuit sections. A delay amount control section 57 computes correction values of delay amounts in the delay amount varying sections $55_1$ to $55_N$ based on temperature monitor signals $T_1$ to $T_N$ output from the temperature monitoring sections $56_1$ to $56_N$, to perform the temperature compensation of the delay deviation. As a result, differential delays among the drive signals $D_1$ to $D_N$ to be output from the driving sections $54_1$ to $54_N$ to the optical modulating sections $52_1$ to $52_N$ are controlled to be constant irrespective of the temperature variation, and accordingly, it becomes possible to prevent the signal deterioration caused by temperature characteristics of the electronic circuit sections corresponding to the optical modulating sections $52_1$ to $52_N$.

Incidentally, in the first and third embodiments, the delay deviation caused by the temperature characteristics of the electronic circuit sections has not been especially considered. However, similarly to the fifth embodiment, the configurations in the first and third embodiments, the disposition of the temperature monitoring sections in the vicinity of the electronic circuits is also effective for achieving the precision improvement of the temperature compensation. Further, in the fifth embodiment, the one example has been shown in which the integrated optical modulator is used for the configuration in the first embodiment. It is also possible to apply an integrated optical modulator in which a plurality of optical modulating sections is collectively formed on one waveguide substrate, to the second and third embodiments.

Next, there will be described specific application examples of the above described respective embodiments. Note, in the following description, the specific description will be made mainly on a configuration example corresponding to the first embodiment in which the plurality of optical modulators is serially arranged. However, it is also possible to apply a similar configuration example to each of the remaining embodiments.

Figure 6:
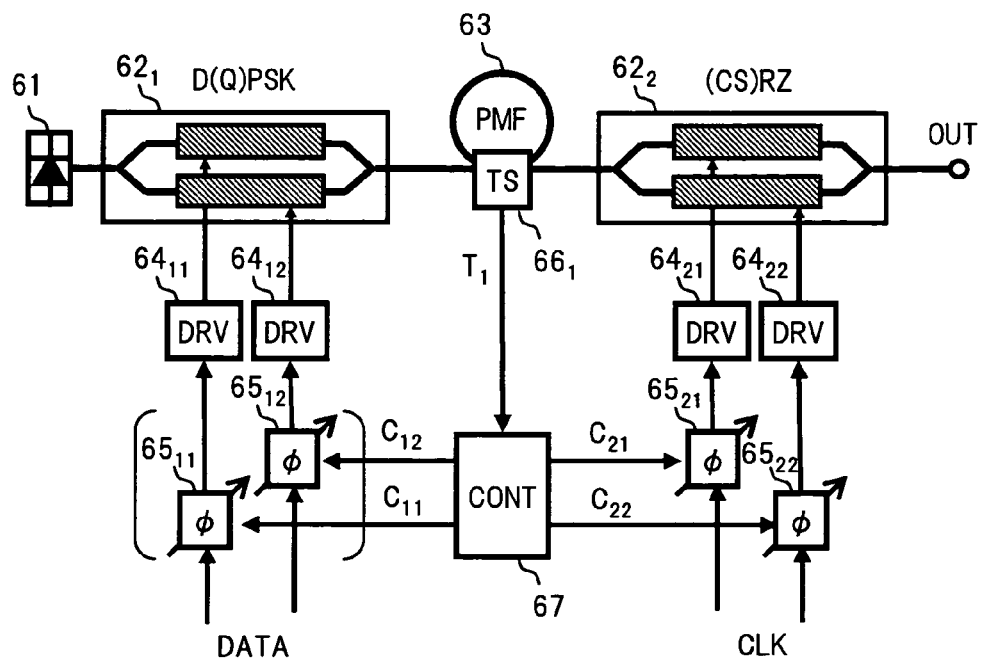
FIG. 6 is a block diagram showing a first specific configuration example of the optical transmission apparatus according to the present invention.

FIG. 6 is a block diagram showing a first specific configuration example of the optical transmission apparatus according to the present invention.

In the configuration example shown in FIG. 6, a phase modulator $62_1$ which is driven in accordance with a data signal DATA and a (CS)RZ pulsing intensity modulator $62_2$ which is driven in accordance with a clock signal CLK are serially connected to each other via a polarization maintaining fiber (PMF) 63 between a CW light source 61 and an output port OUT, so that the temperature of the PMF 63 is always monitored by a temperature sensor (TS) $66_1$, such as a thermocouple or the like, which is disposed in the vicinity or a position in contact with the PMF 63 in which a delay amount of a propagated optical signal is changed depending on the temperature.

The phase modulator $62_1$ includes, for example, a set of modulation electrodes formed on respective branching waveguides of the Mach-Zehnder interferometer, and drive signals output from respective driving sections (DRV) $64_{11}$ and $64_{12}$ are applied on the respective modulation electrodes. To the driving sections $64_{11}$ and $64_{12}$, the data signals DATA of 43 Gbit/s, 21.5 Gbit/s or the like, for example, are input via delay amount varying sections ($\phi$) $65_{11}$ and $65_{12}$. Similarly to the phase modulator $62_1$, the RZ pulsing intensity modulator $62_2$ also includes a set of modulation electrodes formed on respective branching waveguide of the Mach-Zehnder interferometer, and drive signals output from respective driving sections $64_{21}$ and $64_{22}$ are applied on the respective modulation electrodes. To the driving sections $64_{21}$ and $64_{22}$, the clock signals CLK of 43 GHz, 21.5 GHz, 10.75 GHz or the like, for example, are input via delay amount varying sections $65_{21}$ and $65_{22}$.

Figure 7:
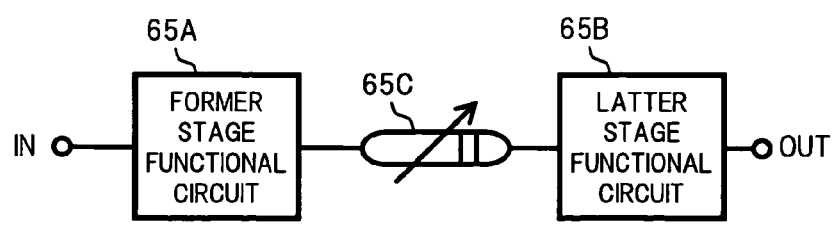
FIG. 7 is a diagram showing a specific circuit configuration of a delay amount varying section in the above configuration example.
Figure 8:
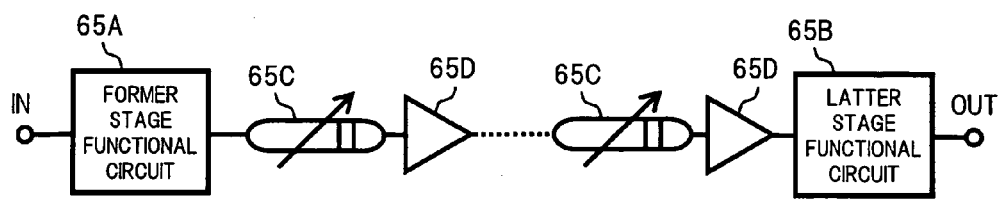
FIG. 8 is a diagram showing another specific circuit configuration of the delay amount varying section in the above configuration example.
Figure 9:
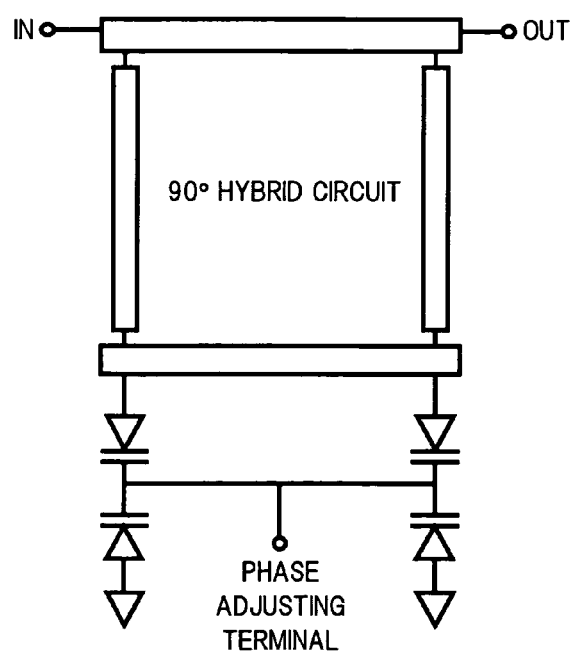
FIG. 9 is a diagram showing a further specific circuit configuration of the delay amount varying section in the above configuration example.

The delay amount varying sections $65_{11}$ to $65_{22}$ each comprises, for example, a delay amount variable circuit and an amplifying circuit for compensating for a loss of the delay amount variable circuit. As a specific circuit configuration, as shown in FIG. 7 for example, such a configuration can be applied in which functional circuits 65A and 65B each incorporating therein an amplifying circuit are connected to the front and the rear of a delay amount variable circuit 65° C. For the former stage functional circuit 65A, a voltage-controlled oscillator (VCO), a clock distribution IC, a logic IC or the like is used, and for the latter stage functional circuit 65B, a clock distribution IC, a logic IC or the like is used. Further, as shown in FIG. 8 for example, such a configuration may be applied in which a plurality of delay amount variable circuits 65C is serially connected to each other between the former and latter stage functional circuits 65A and 65B and amplifying circuits 65D are respectively arranged on output ends of the delay amount variable circuits 65C. Further, as shown in FIG. 9 for example, it is also possible to apply a configuration in which a 90° hybrid circuit is utilized.

Delay amounts in the delay amount varying sections $65_{11}$ to $65_{22}$ are respectively controlled in accordance with control signals $C_{11}$ to $C_{22}$ output from a delay amount control section (CONT) 67 based on a temperature monitor signal $T_1$ from a temperature sensor $66_1$, so that the delay deviation caused by the temperature dependence of the delay amount in the PMF 63 is compensated. Incidentally, the temperature compensation of the delay deviation can be performed, if the delay amount control by the delay amount control section 67 is performed on at least either the delay amount varying sections $65_{11}$ and $65_{12}$ on the phase modulator $62_1$ side, or the delay amount varying sections $65_{21}$ and $65_{22}$ on the RZ pulsing intensity modulator $62_2$ side.

Here, there will be described in detail a specific example of the computation processing in the delay amount control section 67.

When the temperature monitored by the temperature sensor $66_1$ is t° C., a differential delay between the data signal DATA and the clock signal CLK can be calculated in accordance with a relational expression of linear function shown in the next equation (1) for example.

$$\text{Delay }(CLK)-\text{Delay }(DATA)=\Delta D_{25°\ C.}+\text{Slope} \times (t-25) \quad (1)$$

In the above equation, Delay (CLK) [ps] indicates a delay amount of the clock signal, Delay (DATA) [ps] indicates a delay amount of the data signal, $\Delta D_{25°\ C.}$ [ps] indicates a differential delay (zero-order constant term) between the data signal and the clock signal at 25° C., and Slope [ps/° C.] indicates an inclination (first-order coefficient) of the differential delay between the data signal and the clock signal relative to the temperature t.

Figure 10:
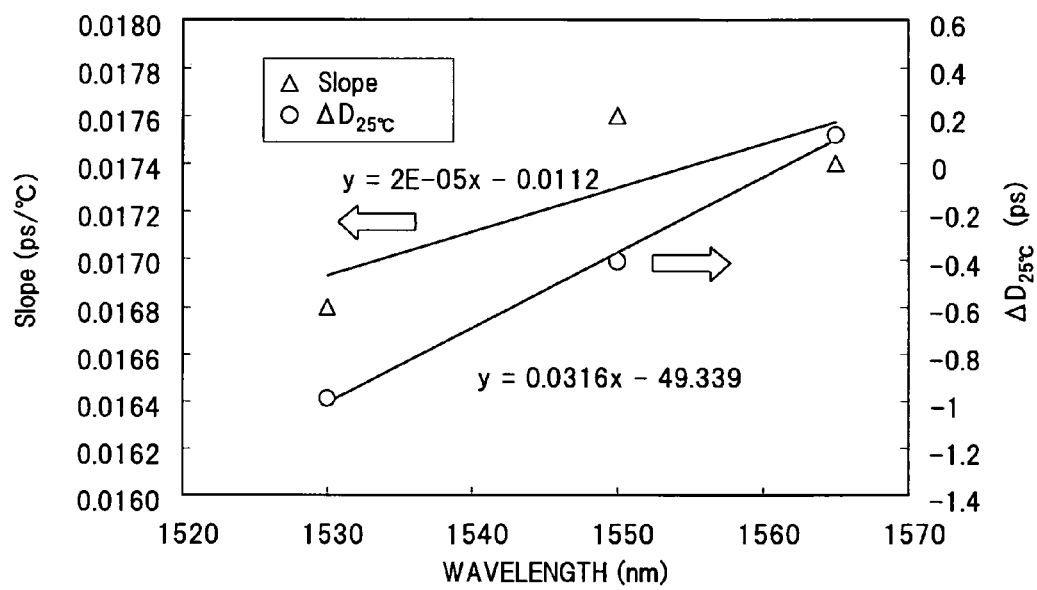
FIG. 10 is a graph showing one example of coefficients of relational expression to be used in a delay amount control section.

To be specific, when for example a polarization maintaining fiber of 400 μm coated outer diameter is used as the PMF 63 shown in FIG. 6, assuming that the differential delay between the data signal and the clock signal is obtained by applying the above equation (1), optimum values of the zero-order constant term $\Delta D_{25°\ C.}$ and the first-order coefficient Slope are values as shown in FIG. 10 for example. Incidentally, from FIG. 10, it is understood that $\Delta D_{25°\ C.}$ and Slope are changed depending on wavelengths. These changes mainly occur due to the chromatic dispersion of the PMF. Therefore, as a way of deciding $\Delta D_{25°\ C.}$ and Slope in the equation (1), it is preferable to fix $\Delta D_{25°\ C.}$ and Slope irrespective of the wavelengths (for example, values at 1550 nm) or to set $\Delta D_{25°\ C.}$ and Slope to be wavelength functions. In the case where the former way is applied, the delay deviation due to the wavelengths is made allowable, while in the case where the latter way is applied, it becomes possible to perform the high precision compensation.

Figure 11:
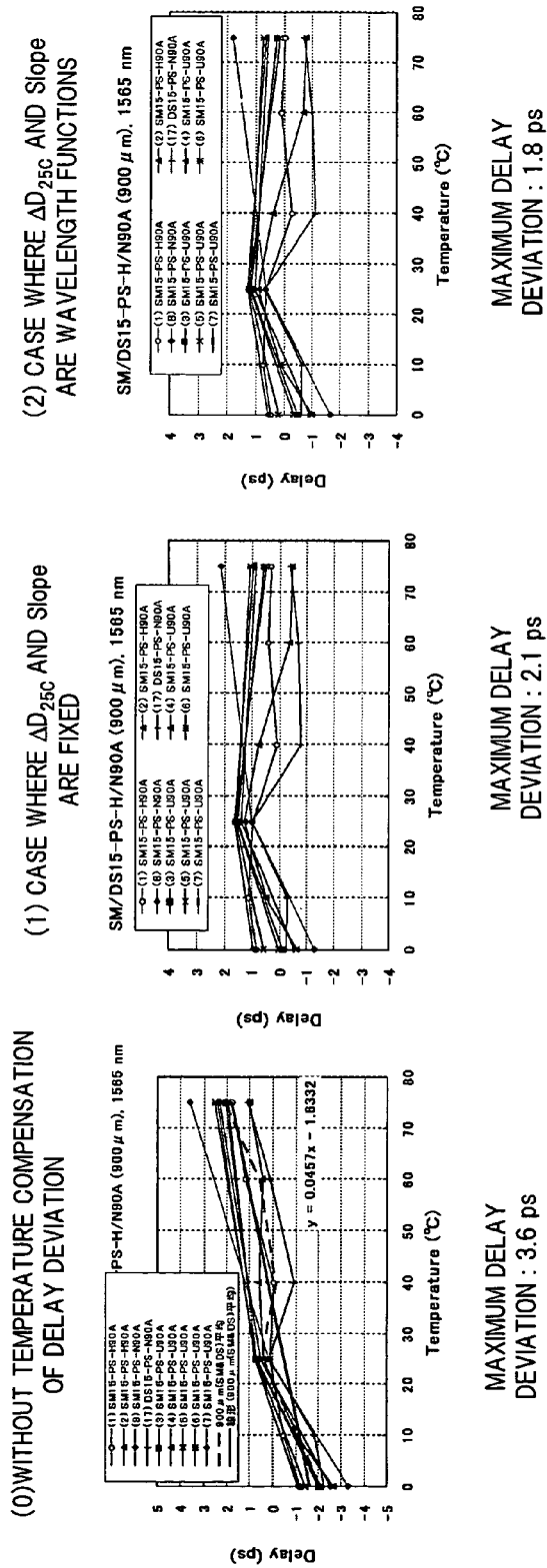
FIG. 11 is a diagram showing measurement results of delay deviation amount for a PMF of 900 μm coated outer diameter.
Figure 12:
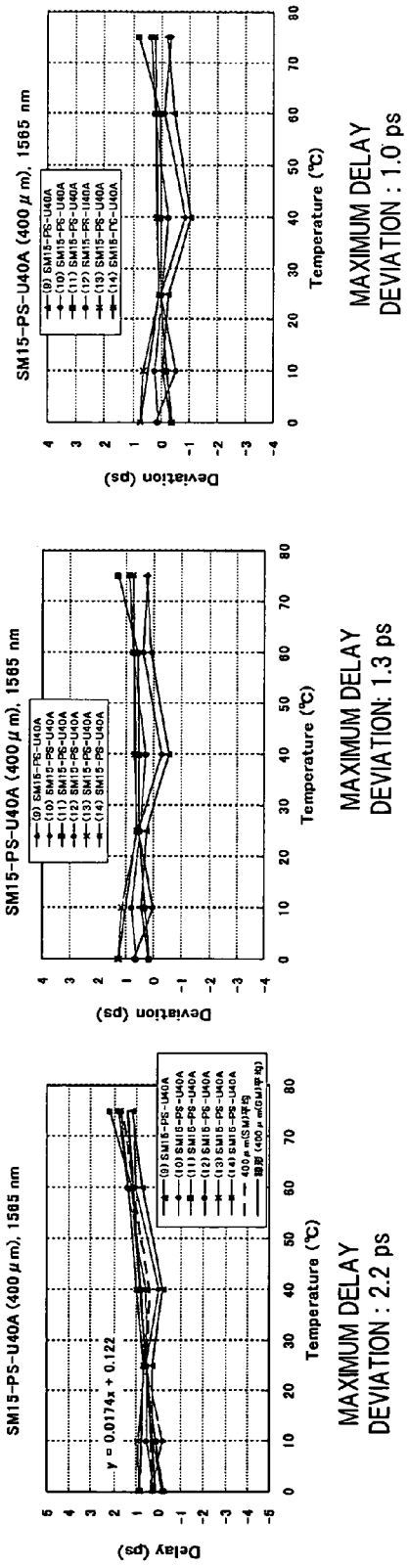
FIG. 12 is a diagram showing measurement results of delay deviation amount for a PMF of 400 μm coated outer diameter.

FIG. 11 and FIG. 12 are diagrams showing one example of measurement results of a delay deviation amount relative to the temperature. The measurement results of FIG. 11 show the case (0) where the temperature compensation of the delay deviation is not performed, the case (1) where $\Delta D_{25°\ C.}$ and Slope are fixed irrespective of the wavelength and the temperature compensation of the delay deviation is performed, the case (2) where $\Delta D_{25°\ C.}$ and Slope are set to be wavelength functions and the temperature compensation of the delay deviation is performed, for the PMF of 900 μm coated outer diameter using polyester elastomer. Further, the measurement results of FIG. 12 show similar results for the PMF of 400 μm coated outer diameter using an ultraviolet curing resin (UV). From each figures, it is understood that the delay deviation amount can be made smaller, by setting $\Delta D_{25°\,C.}$ and Slope to be the wavelength functions to perform the temperature compensation of the delay deviation.

Figure 13:
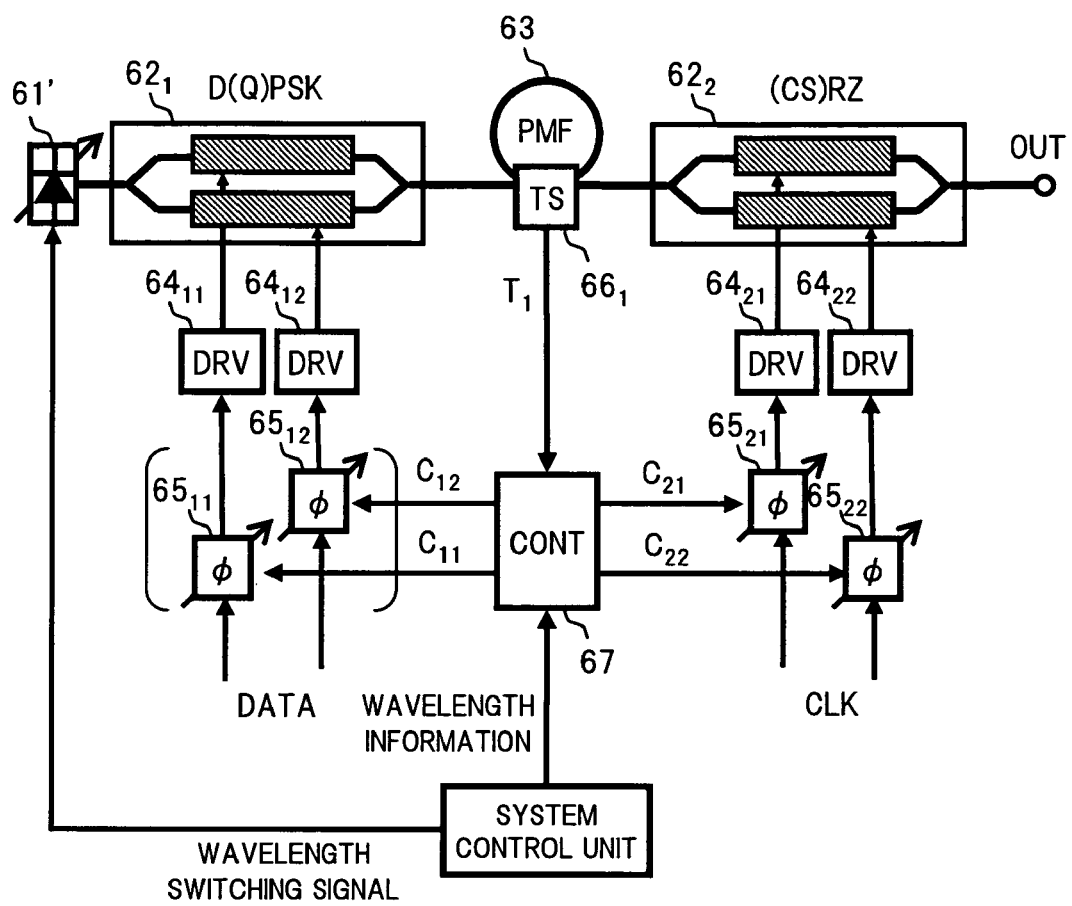
FIG. 13 is a diagram explaining an application method in the case where the coefficients of the relational expression to be used in the delay amount control section is a wavelength function.

Actually, with regard to an application method in the case where $\Delta D_{25°\,C.}$ and Slope are set to be the wavelength functions, it is considerable that for example a wavelength is decided at the time of product manufacturing, and a delay amount according to the decided wavelength is provided. Further, it is also considerable that, in a system as shown in FIG. 13 for example, at the time of system setting up (containing the time of system resetting up after the failure repair) and at the time of wavelength switching, wavelength information is acquired from a system control unit of the overall system, to thereby set a wavelength of a wavelength variable light source 61' and also to provide a delay amount according to the set wavelength.

Moreover, it is also possible to calculate the differential delay between the data signal and the clock signal relative to the temperature in accordance with a polynomial of the temperature shown in the next equation (2) for example, and if this equation is applied, the precision of the temperature compensation of the delay deviation can be further improved.

$$\text{Delay}(CLK) - \text{Delay}(DATA) = \Delta D_{25°C.} + \sum_{i=1}^{n} a_i \cdot (t - 25)^i \quad (2)$$

In the above equation (2), $a_i$ [ps/° C.] indicates an inclination of i-order of the differential delay between the data signal and the clock signal relative to the temperature t.

Figure 14:
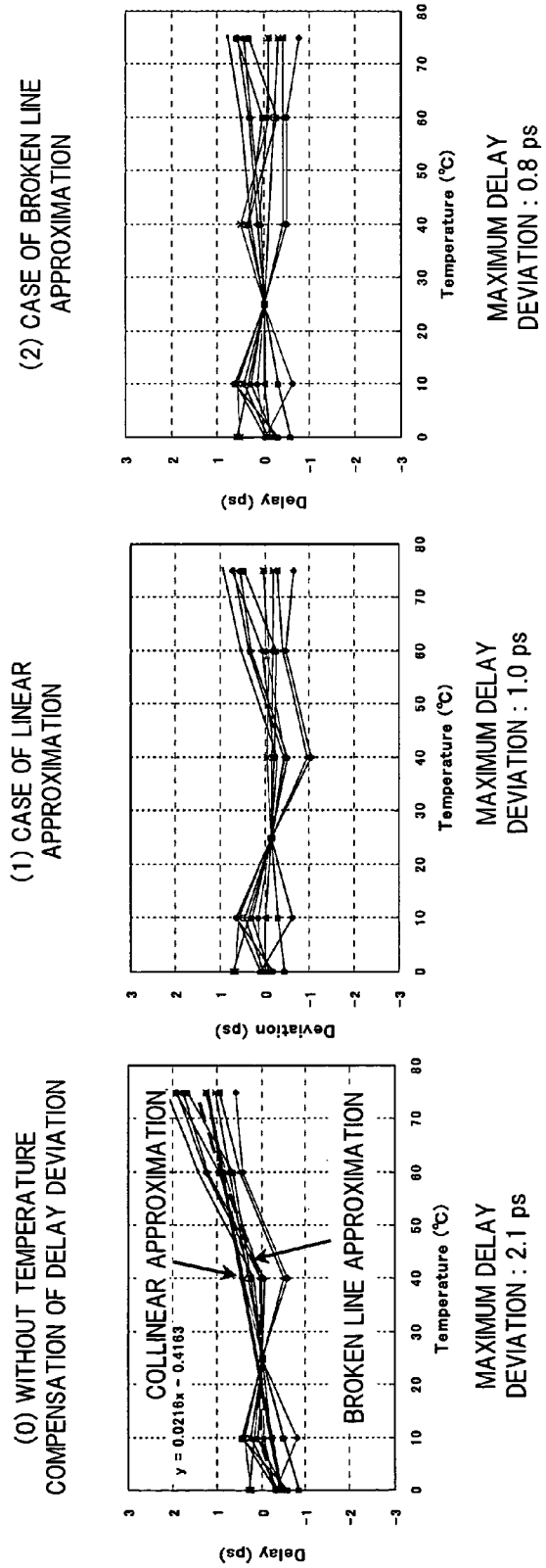
FIG. 14 is a diagram showing measurement results of delay deviation amount in the case where the broken line approximation is used in the delay amount control section.

Further, other than the above equation (1) or (2), the differential delay between the data signal and the clock signal relative to the temperature can be calculated using for example the broken line approximation relative to the temperature t. FIG. 14 is a diagram showing one example of measurement results of the delay deviation amount relative to the temperature in the case of using the broken line approximation. The broken line can be decided to take the center between maximum and minimum values or an average value of the delay variation at each temperature. As shown in (2) of FIG. 14, it is understood that the delay deviation amount is reduced in the case where the broken line approximation is used.

Incidentally, in comparison with the measurement results in the case of the PMF of 900 μm coated outer diameter using polyester elastomer shown in FIG. 11 with the measurement results in the case of the PMF of 400 μm coated outer diameter using the ultraviolet curing resin shown in FIG. 12, it is understood that an absolute value of the delay amount and the variation in the delay amount depending on the temperature variation in the PMF of smaller coated outer diameter are further reduced than those in the PMF of larger coated outer diameter. This is because when the coating is thermally expanded, a force for extending a fiber core in the optical fiber of smaller coated outer diameter is smaller than that in the optical fiber of larger coated outer diameter. Thus, by paying attention to types (materials, diameters) of the coating of optical fiber to be applied to the optical transmission apparatus, it becomes possible to further effectively perform the temperature compensation of the delay deviation by selectively using the optical fiber of small temperature variation of the delay amount. In particular, in the case of using the PMF of 400 μm coated outer diameter using the ultraviolet curing resin as described above, as shown in (0) of FIG. 12, since the delay deviation can be suppressed to a relatively low level without the necessity of performing the compensation based on the monitoring result of the temperature, it becomes also possible to omit the delay amount varying sections $65_{11}$ to $65_{22}$, the temperature sensor $66_1$ and the delay amount control section 67 in the configuration example of FIG. 6, depending on an allowable range of the delay deviation amount. An optical fiber code having a possibility that the temperature compensation of the delay deviation becomes unnecessary as described above is required to have a thermal dependence coefficient of an optical propagation speed of 0.07 ps/° C./m or lower. To be specific, a polarization maintaining fiber which uses the ultraviolet curing resin as the coating material or a polarization maintaining fiber 400 μm or lower coated outer diameter is a prerequisite for the optical fiber code.

Figure 15:
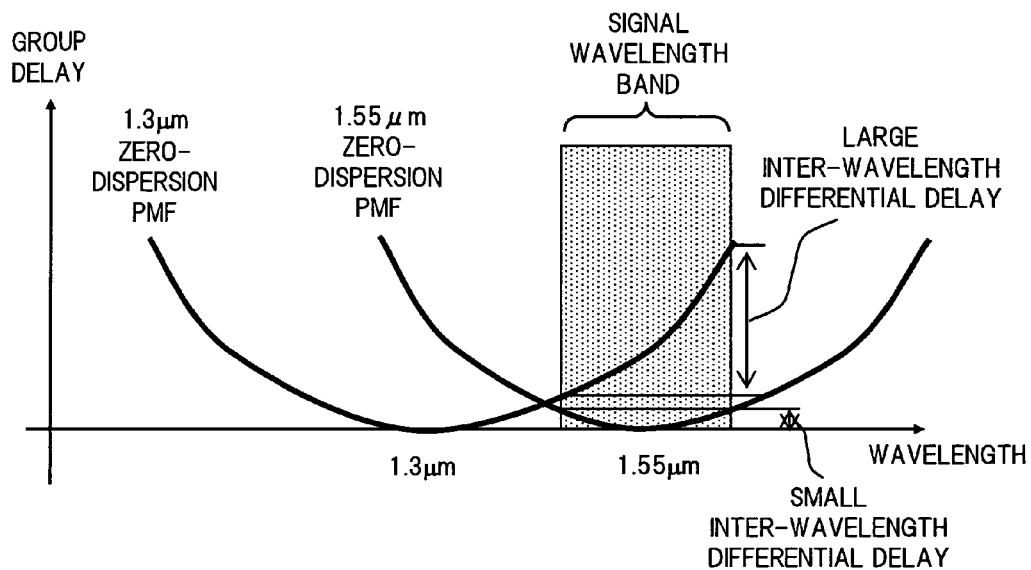
FIG. 15 is a graph showing an inter-wavelength differential delay for when a 1.55 μm zero-dispersion PMF is used.

Further, as described in the above referring to FIG. 10, since there is a problem in that $\Delta D_{25°\,C.}$ and Slope in the equation (1) are changed mainly due to the chromatic dispersion of the PMF, the two ways are exemplarily shown as the deciding way of $\Delta D_{25°\,C.}$ and Slope. However, to solve such a problem, for example a method of selecting a PMF in which the chromatic dispersion becomes zero at a 1.55 μm signal wavelength band is also effective. Namely, as shown in FIG. 15, a delay characteristic of a normally used 1.31 μm zero-dispersion PMF has a shape of quadratic function in which 1.3 μm is a minimum point, and an inter-wavelength difference of delay amount at the 1.55 pm signal wavelength band is increased. Contrary to this, in a delay characteristic of a 1.55 μm zero-dispersion PMF, since a minimum point of quadratic function is in the signal wavelength band, the inter-wavelength difference of delay amount can be suppressed to be small. Accordingly, in the case where the vicinity of 1.55 μm is the signal wavelength band, the application of the 1.551 μm zero-dispersion PMF as PMFs connecting a plurality of optical modulators is effective for solving the problem caused by the chromatic dispersion as described above.

Next, there will be described a second specific configuration example.

Figure 16:
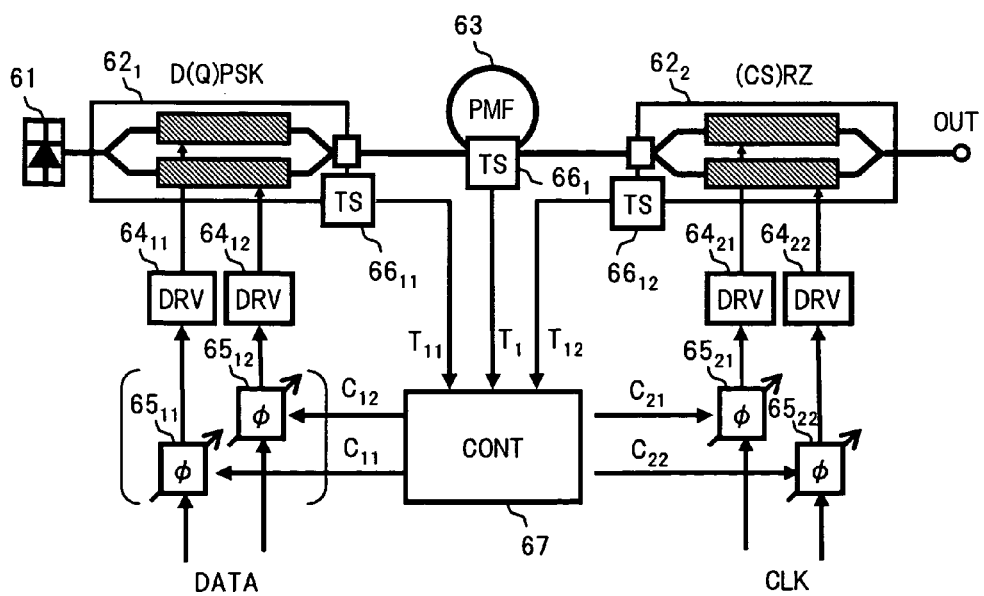
FIG. 16 is a block diagram showing a second specific configuration example of the optical transmission apparatus according to the present invention.

FIG. 16 is a block diagram showing the second specific configuration example of the optical transmission apparatus according to the present invention.

In the configuration example shown in FIG. 16, for the first specific configuration example (FIG. 6), temperature sensors $66_{11}$ and $66_{12}$ are added in order to compensate for the temperature variation of differential delay, which occurs in each modulator itself due to the thermal expansion of fixing portions of the waveguide substrates which are used for the phase modulator $62_1$ and the (CS)RZ pulsing intensity modulator $62_2$ to the polarization maintaining fiber 63, the thermal expansion of the waveguide length in each of the modulators $62_1$ and $62_2$, or the like. In the temperature sensor $66_{11}$, for example a thermocouple or the like is disposed in the vicinity of or a position in contact with a portion where the temperature variation of the phase modulator $62_1$ easily occurs, so that the temperature of the phase modulator $62_1$ is always monitored, and a temperature monitor signal $T_{11}$ indicating a monitoring result thereof is output to the delay amount control section 67. Further, in the temperature sensor $66_{12}$, for example a thermocouple or the like is disposed in the vicinity of or a position in contact with a portion where the temperature variation of the (CS)RZ pulsing intensity modulator $62_2$ easily occurs, so that the temperature of the (CS)RZ pulsing intensity modulator $62_2$ is always monitored, and a temperature monitor signal $T_{12}$ indicating a monitoring result thereof is output to the delay amount control section 67.

In the delay amount control section 67, the differential delays between the data signal and the clock signal are obtained using the relational expression and the broken line approximation as described in the above, based on temperature monitor signals $T_1$, $T_{11}$ and $T_{12}$ output from the respective temperature sensors $66_1$, $66_{11}$, and $66_{12}$. Incidentally, in the case where the temperature variation of delay deviation in each modulator as a single piece is obtained based on the temperature monitor signals $T_{11}$ and $T_{12}$, it is possible to perform the computation similarly to the case of the PMF by adjusting the coefficients in the relational expression as described above. Then, when the differential delays corresponding to the temperature monitor signals $T_1$, $T_{11}$ and $T_{12}$ are obtained, the correction values of the delay amounts in the delay amount varying sections $64_{11}$, to $64_{22}$ are calculated according to a value obtained by adding up the differential delays, and the control signals $C_{11}$ to $C_{22}$ indicating the calculation results are output to the respective delay amount varying sections $64_{11}$ to $64_{22}$. As a result, the temperature compensation of delay deviation is performed considering the temperature dependence of delay amount not only in the PMF 63 but also in each of the modulators $62_1$ and $62_2$, and therefore, it becomes possible to perform the temperature compensation with higher precision.

Next, there will be described a third specific configuration example.

Figure 17:
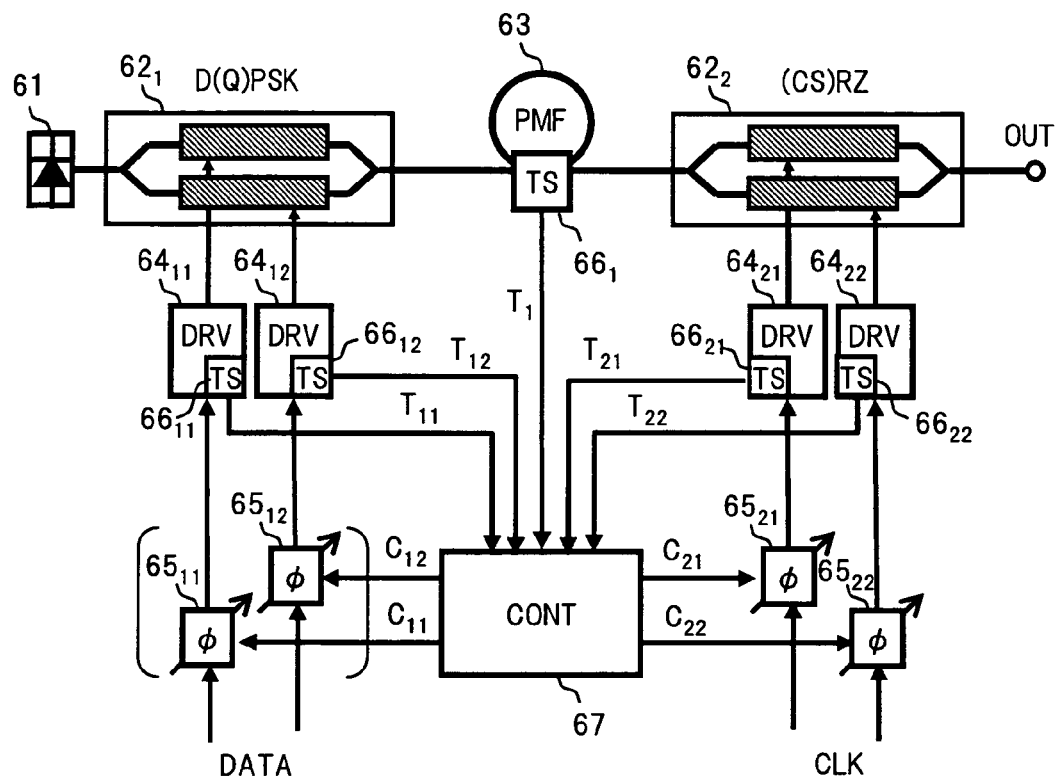
FIG. 17 is a block diagram showing a third specific configuration example of the optical transmission apparatus according to the present invention.

FIG. 17 is a block diagram showing the third specific configuration example of the optical transmission apparatus according to the present invention.

In the configuration example shown in FIG. 17, for the first specific configuration example (FIG. 6), temperature sensors $66_{11}$ to $66_{22}$ corresponding to the driving sections $64_{11}$ to $64_{22}$ are added, in order to compensate for the temperature variation of differential delay which occurs in each of the electronic circuits constituting the driving sections $64_{11}$ to $64_{22}$. The respective temperature sensors $66_{11}$ to $66_{22}$ are disposed in the electronic circuits constituting the driving sections $64_{11}$ to $64_{22}$, to always monitor the temperature of each of the electronic circuits, and output respectively temperature monitor signals $T_{11}$ to $T_{22}$ indicating monitoring results thereof to the delay amount control section 67. As a specific configuration of each of the temperature sensors $66_{11}$ to $66_{22}$, it is possible to use a temperature sensor IC, such as a product "TMP123" by Texas Instruments, Inc. (URL: http://focus.ti-.com/litds/symlink/tmp123.pdf), for example.

In the delay amount control section 67, the differential delays between the data signal and the clock signal are obtained using the relational expression and the broken line approximation as described above, based on temperature monitor signals $T_1$ and $T_{11}$ to $T_{22}$ output from the temperature sensors $66_1$ and $66_{11}$ to $66_{22}$. Also in the case where the temperature variation of delay amount in each of the electronic circuits constituting the driving sections is obtained based on the temperature monitor signals $T_{11}$ to $T_{22}$, it is possible to perform the computation similarly to the case of the PMF by adjusting the coefficients in the relational expression as described above. Then, when the differential delays corresponding to the temperature monitor signals $T_1$ and $T_{11}$ to $T_{22}$ are obtained, the correction values of the delay amounts in the delay amount varying sections $64_{11}$, to $64_{22}$ are calculated according to a value obtained by adding up the differential delays, and the control signals $C_{11}$ to $C_{22}$ indicating the calculation results are output to the respective delay amount varying sections $64_{11}$ to $64_{22}$. As a result, the temperature compensation of delay deviation is performed considering the temperature dependence of delay amount not only in the PMF 63 but also in each of the driving sections $64_{11}$ to $64_{22}$, and therefore, it becomes possible to perform the temperature compensation with higher precision.

Next, there will be described a fourth specific configuration example.

Figure 18:
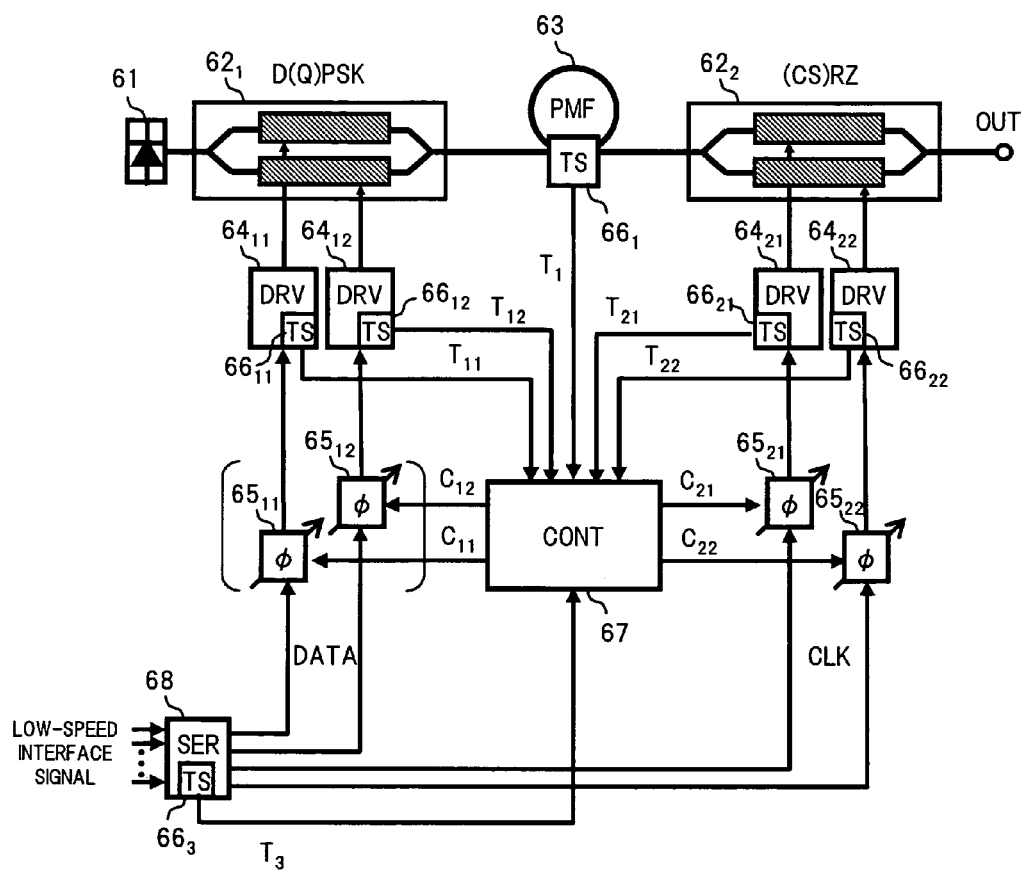
FIG. 18 is a block diagram showing a fourth specific configuration example of the optical transmission apparatus according to the present invention.

FIG. 18 is a block diagram showing the fourth specific configuration example of the optical transmission apparatus according to the present invention.

In the configuration example shown in FIG. 18, for the third specific configuration example (FIG. 17), a serializer (SER) 68 is added. This serializer 68 multiplexes low-speed interface signals input to the present optical transmission apparatus, to generate a data signal DATA of for example 43 Gbit/s, 21.5 Gbit/s or the like and a clock signal CLK of for example 43 GHz, 21.5 GHz, 10.75 GHz or the like. Also in an electronic circuit constituting this serializer 68, a differential delay between the data signal DATA and clock signal CLK to be output is changed depending on the temperature. Therefore, a temperature sensor $66_3$ which always monitors the temperature of the serializer 68 is disposed in the electronic circuit constituting the serializer 68, and a temperature monitor signal $T_3$ is output from the temperature sensor $66_3$ to the delay amount control section 67. In the delay amount control section 67, similarly to the third specific configuration example, the correction values of the delay amount in the delay amount varying sections $64_{11}$ to $64_{22}$ are calculated, so that the temperature compensation of delay deviation is performed.

Next, there will be described a fifth specific configuration example.

Figure 19:
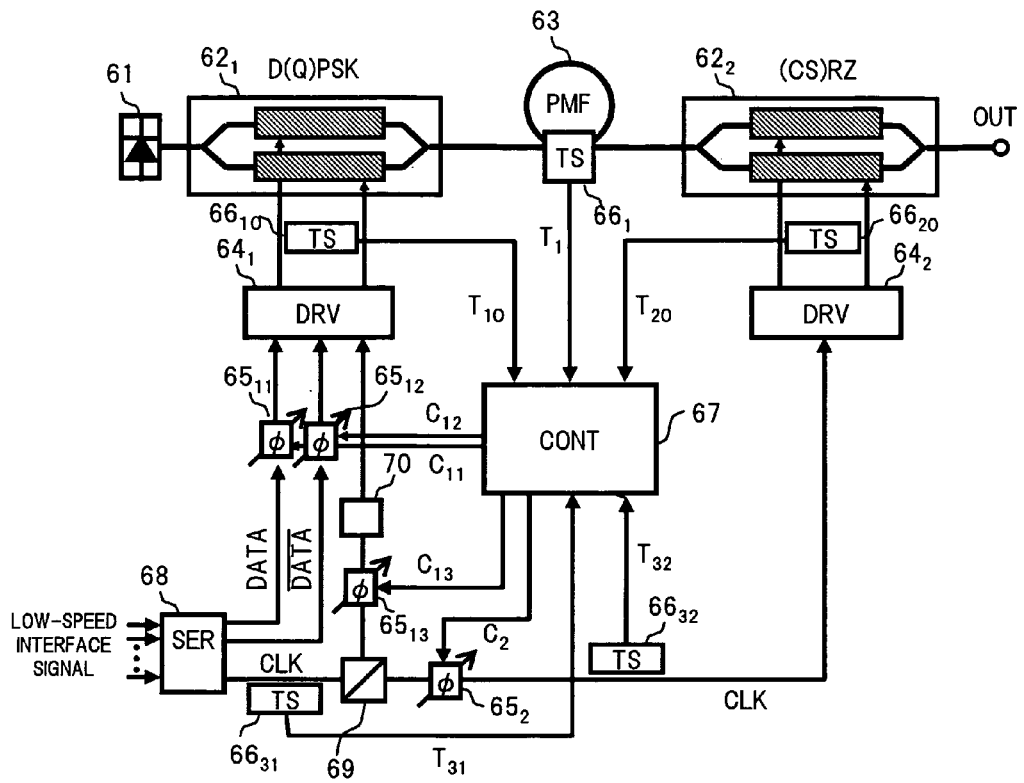
FIG. 19 is a block diagram showing a fifth specific configuration example of the optical transmission apparatus according to the present invention.

FIG. 19 is a block diagram showing the fifth specific configuration example of the optical transmission apparatus according to the present invention.

The configuration shown in FIG. 19 is one example obtained by modifying the fourth specific configuration example (FIG. 18). Herein, the drive signals provided for the respective modulation electrodes of the phase modulator $62_1$ are generated by a common driving section $64_1$, and a temperature sensor $66_{10}$ is arranged in the vicinity of an electric coaxial cable which connects between the driving section 64, and each of the modulation electrodes. Further, the drive signals provided for the respective modulation electrodes of the (CS)RZ pulsing intensity modulator $62_2$ are generated by a common driving section $64_2$, and a temperature sensor $66_{20}$ is arranged in the vicinity of an electric coaxial cable which connects between the driving section $64_2$ and each of the modulation electrodes. Furthermore, the serializer 68 outputs the data signal DATA of for example 43 Gbit/s and an inversion data signal /DATA to the driving section $64_1$ via the delay amount varying sections $65_{11}$ and $65_{12}$, and also outputs the clock signal CLK of 21.5 GHz to a branching section 69. The branching section 69 branches the clock signal CLK from the serializer 68 into two, and sends one of the branched clock signals CLK to the driving section $64_1$ via the delay amount varying section $65_{13}$ and a frequency doubler 70 while sending the other clock signal CLK to the driving section $64_2$ via the delay amount varying section $65_2$. Moreover, a temperature sensor $66_{31}$ is arranged in the vicinity of an electric coaxial cable connected to an output side of the serializer 68, and a temperature sensor $66_{32}$ is arranged in the vicinity of an electric coaxial cable which connects between the branching section 69 and the driving section $64_2$.

In the configuration as described in the above, the temperatures of the electric coaxial cables in each of which a delay amount of electric signal being propagated is changed depending on the temperature, are always monitored by the temperature sensors $66_{10}$, $66_{20}$, $66_{31}$ and $66_{32}$, and temperature monitor signals $T_{10}$, $T_{20}$, $T_{31}$ and $T_{32}$ output from the respective temperature monitors $66_{10}$, $66_{20}$, $66_{31}$ and $66_{32}$ are sent to the delay amount control section 67, so that the delay amounts in the delay amount varying sections $65_{11}$, $65_{12}$, $65_{13}$ and $65_2$ are controlled. As a result, it becomes possible to perform the temperature compensation with high precision considering the temperature variation of delay amount not only in the PMF 63 but also in the respective electric coaxial cables.

Next, there will be described a sixth specific configuration example.

Figure 20:
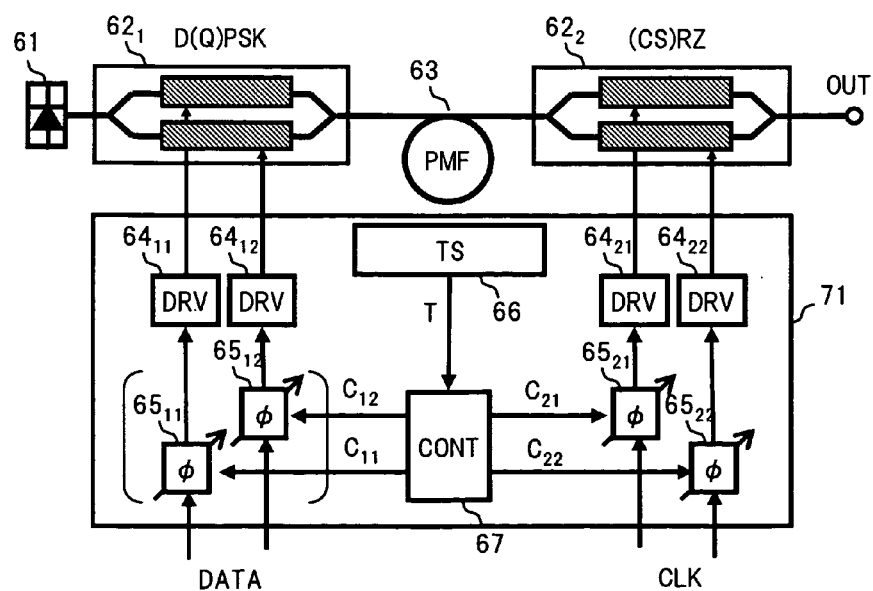
FIG. 20 is a block diagram showing a sixth specific configuration example of the optical transmission apparatus according to the present invention.

FIG. 20 is a block diagram showing the six specific configuration example of the present optical transmission apparatus according to the present invention.

The configuration shown in FIG. 20 is one example obtained by modifying the first to third specific configuration examples, in which a temperature sensor IC 66 is disposed on an electronic circuit substrate 71 positioned in the vicinity of the PMF 63 which connects the modulators $62_1$ and $62_2$ to each other. The electronic circuit substrate 71 is a common substrate on which the delay amount varying sections $65_{11}$ to $65_{22}$ and the delay amount control section 67 are mounted respectively. The mounting work of the temperature sensor IC 66 on the electronic circuit substrate 71 is easier than the attaching work of the thermocouple to the PMF 63, and accordingly, the temperature of the PMF 63 can be monitored relatively in easy, by disposing the temperature sensor IC 66 on a portion positioned in the vicinity of the PMF 63 on the electronic circuit substrate 71. Further, if the dispersion in the temperature distribution on the electronic circuit substrate 71 is small, the temperature of the electronic circuit constituting each of the driving sections $64_{11}$ to $64_{22}$ can also be monitored by the temperature sensor IC 66. Consequently, by applying the configuration as described above, it becomes possible to provide at further low cost the optical transmission apparatus capable of performing the temperature compensation of delay deviation.

Figure 21:
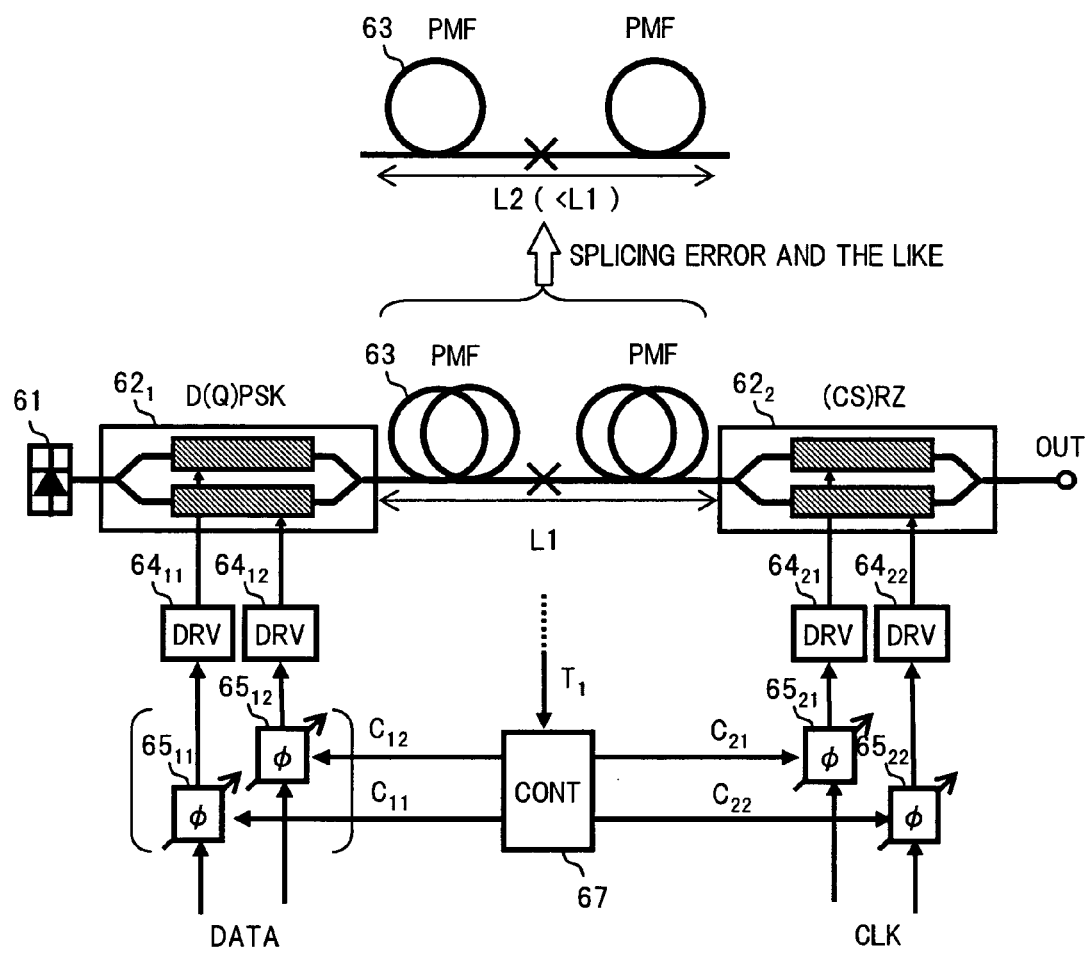
FIG. 21 is a diagram for explaining the application relating to the first to sixth specific configuration examples.
Figure 22:
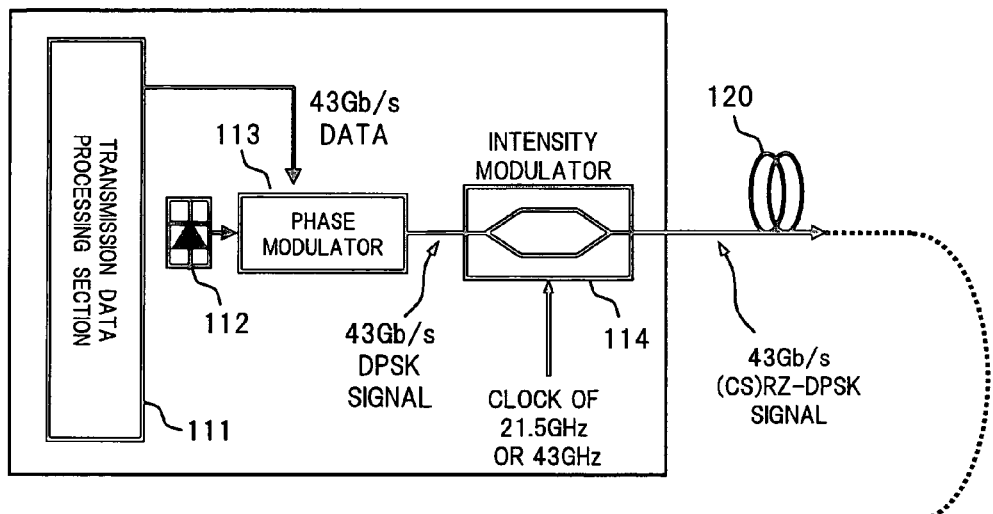
FIG. 22 is a diagram showing a system configuration example to which a (CS)RZ-DPSK modulation format is adopted.
Figure 22:
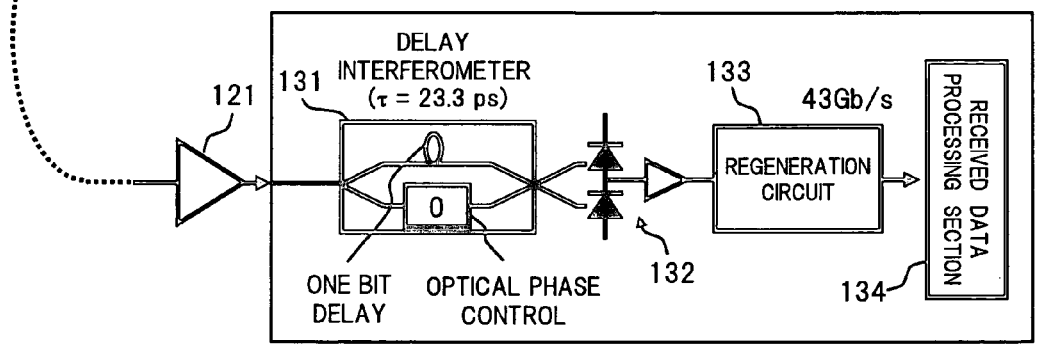
Figure 23:
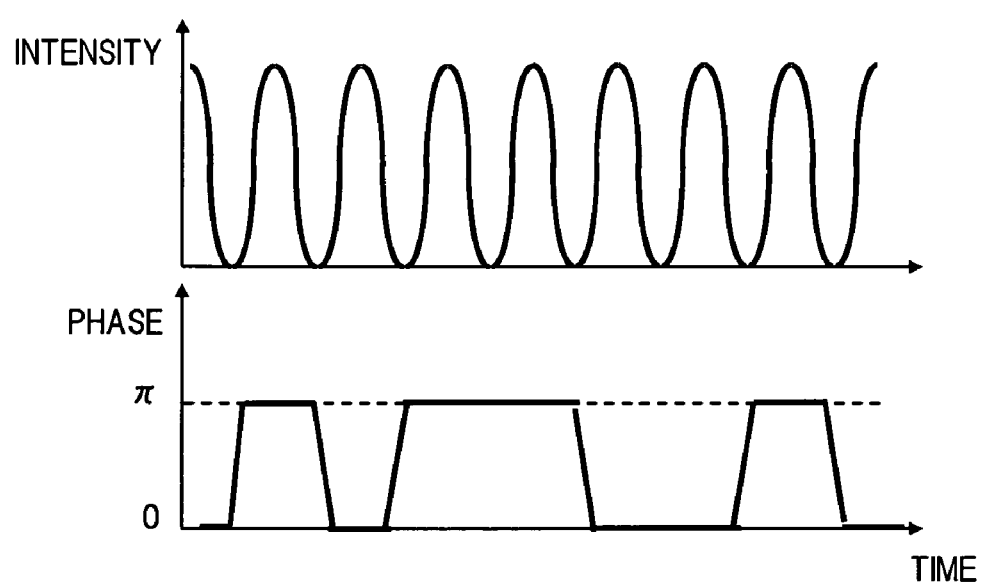
FIG. 23 is a graph showing states of optical intensity and optical phase in the system of FIG. 22.
Figure 24:
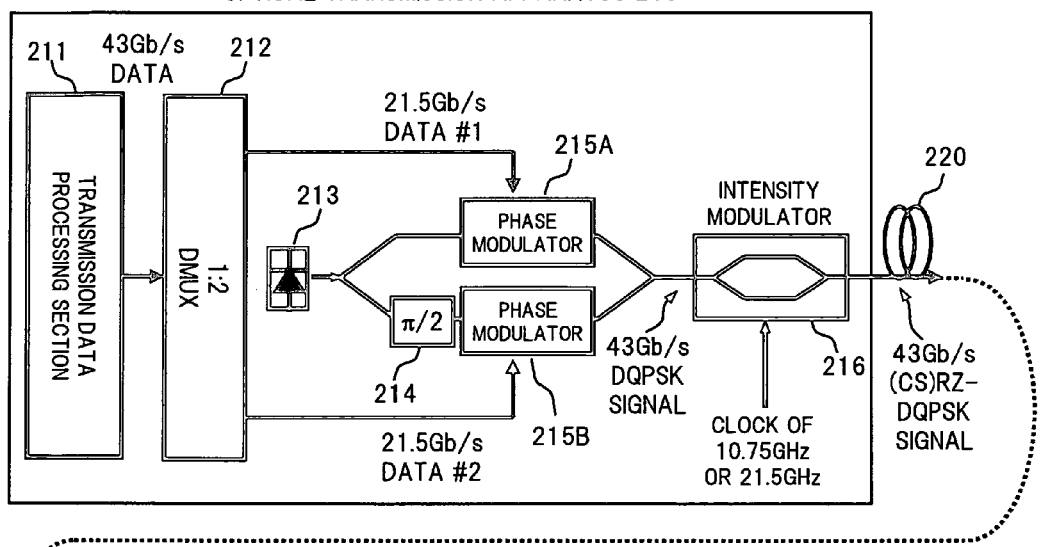
FIG. 24 is a diagram showing a system configuration example to which a (CS)RZ-DQPSK modulation format is adopted.
Figure 24:
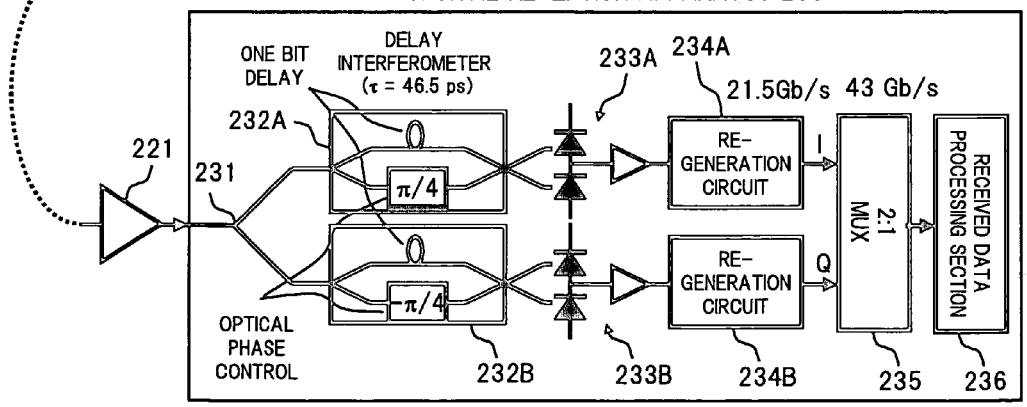
Figure 25:
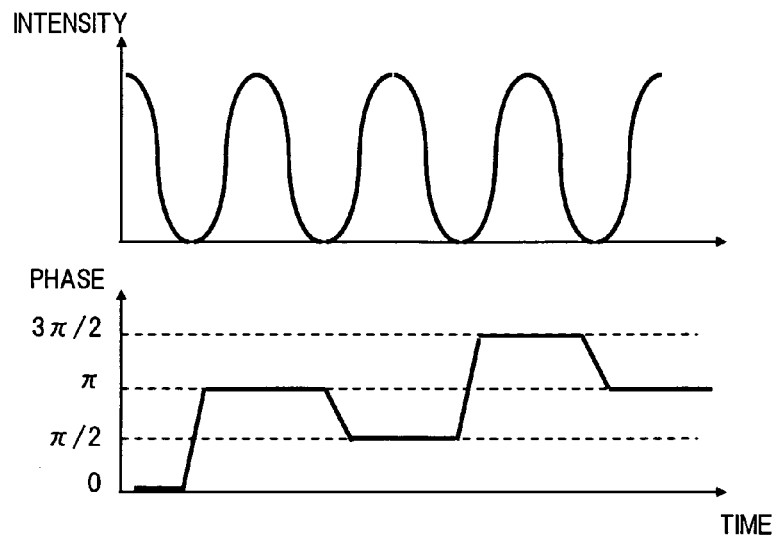
FIG. 25 is a graph showing states of optical intensity and optical phase in the system of FIG. 24.
Figure 26:
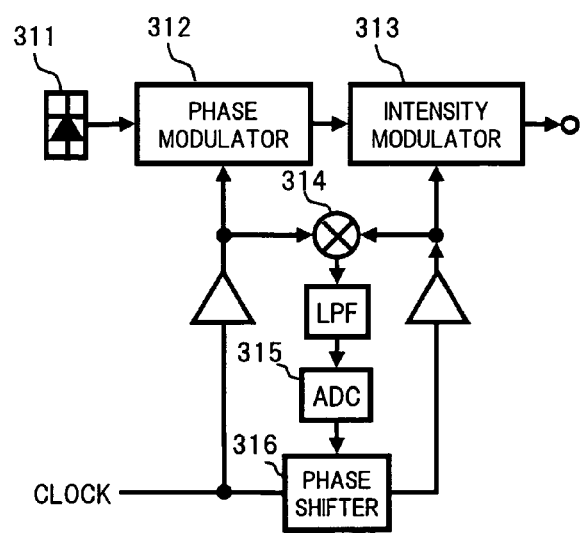
FIG. 26 is a diagram showing a configuration of a conventional optical transmission apparatus which copes with the delay deviation between a plurality of optical modulators.
Figure 27:
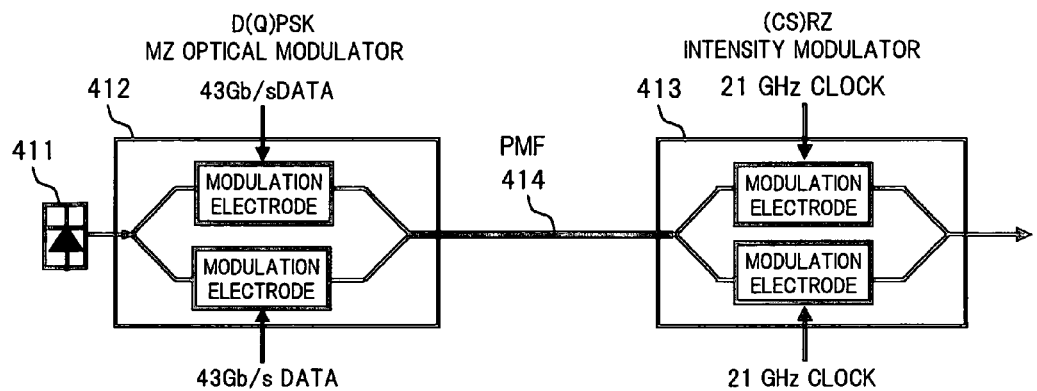
FIG. 27 is diagram explaining problems in the conventional optical transmission apparatus.

Incidentally, in the first to sixth specific configuration examples, as shown in FIG. 21 for example, there may be a possibility that the length (a designed value thereof is L1) of the PMF 63 which connects the modulators $62_1$ and $62_2$ to each other has the length L2 different from the designed value (L2<L1 in the example of FIG. 21) due to the splice processing, the modification of mounting arrangement or the like. To be specific, such a situation occurs due to an error in splicing, the dispersion in splicing length accuracy, the modification of optical modulator arrangement, the modification of winding position of the PMF, or the like. Even in the case where the length of the PMF 63 is changed from the designed value L1, in the configuration of the present optical transmission apparatus, it is possible to easily compensate for the delay deviation between the data signal and the clock signal due to the modification of the length of the PMF 63, by controlling the delay amounts in the delay amount varying sections according to the actual length L2 of the PMF 63 (as a typical example, providing a differential delay of L2/L1 times between the data signal and the clock signal).

What is claimed is:

1. An optical transmission apparatus, which is provided with:
   a plurality of optical modulating sections that modulates light;
   a plurality of driving sections that outputs drive signals for driving said optical modulating sections in accordance with modulating signals input thereto; and
   a delay amount varying section that provides a variable delay amount for at least one modulating signal among the modulating signals respectively input to said plurality of driving sections, to adjust relative timing between the drive signals to be provided respectively for said plurality of optical modulating sections, said apparatus comprising:
   at least one temperature monitoring section that monitors a temperature of a portion where a delay amount of an optical signal being propagated or an electric signal being propagated is changed depending on the temperature; and
   a delay amount control section that controls the delay amount in said delay amount varying section based on the temperature monitored by said temperature monitoring section, so that a differential delay between the drive signals to be provided respectively for said plurality of optical modulating sections is held constant irrespective of a temperature variation, and
wherein said temperature monitoring section is capable of detecting the temperatures of electric circuit sections including said plurality of driving sections and said delay amount varying section, and
said delay amount control section controls the delay amount in said delay amount varying section based on the temperatures monitored by said temperature monitoring section, to compensate for the delay deviation between the drive signals which occurs according to the temperature variation in the delay amount of the electric signal propagated through each of said electronic circuit sections.

2. An optical transmission apparatus according to claim 1, wherein said temperature monitoring section is capable of detecting the temperatures of optical fibers which connect between said plurality of optical modulating sections to each other, and
said delay amount control section controls the delay amount in said delay amount varying section based on the temperatures monitored by said temperature monitoring section, to compensate for the delay deviation between the drive signals which occurs according to the temperature variation in the delay amount of the optical signal propagated through said optical fibers.

3. An optical transmission apparatus according to claim 1, wherein said temperature monitoring section is capable of detecting the temperatures of said plurality of optical modulating sections, and
said delay amount control section controls the delay amount in said delay amount varying section based on the temperatures monitored by said temperature monitoring section, to compensate for the delay deviation between the drive signals which occurs according to the thermal expansion of said plurality of optical modulating sections.

4. An optical transmission apparatus according to claim 3, wherein said temperature monitoring section is disposed in the vicinity of or a position in contact with a portion where the optical fiber for each of said optical modulating sections is fixed.

5. An optical transmission apparatus according to claim 1, wherein said temperature monitoring section is capable of detecting the temperatures of electric signal transmission paths which respectively connect between said delay amount varying section and said plurality of driving sections, and between said plurality of driving sections and said plurality of optical modulating sections, and
said delay amount control section controls the delay amount in said delay amount varying section based on the temperatures monitored by said temperature monitoring section, to compensate for the delay deviation between the drive signals which occurs according to the temperature variation in the delay amount of the electric signal propagated through each of said electric signal transmission path.

6. An optical transmission apparatus according to claim 1, wherein said plurality of optical modulating sections are serially connected to each other via optical fibers, said temperature monitoring section detects on at least one site the temperatures of the optical fibers which connect between said plurality of optical modulating sections, and said delay amount control section controls the delay amount in said delay amount varying section based on the temperatures monitored by said temperature monitoring section, to compensate for the delay deviation between the drive signals which occurs according to the temperature variation in the delay amount of the optical signal propagated through said optical fibers.

7. An optical transmission apparatus according to claim 1, wherein said plurality of optical modulating sections are connected in parallel to each other, to respectively output phase modulated optical signals, and the optical transmission apparatus includes:

a phase shifting section that provides a predetermined optical phase difference between the optical signals output from said optical modulating sections; and a multiplexing section that multiplexes the optical signals provided with the optical phase difference by said phase shifting section, to output a multi-level phase modulated optical signal, said temperature monitoring section detects on at least one site the temperatures of electronic circuit sections including said plurality of driving sections and said delay amount varying section, and said delay amount control section controls the delay amount in said delay amount varying section based on the temperatures monitored by said temperature monitoring section, to compensate for the delay deviation between the drive signals which occurs according to the temperature variation in the delay amount of the electric signal propagated through each of said electronic circuit sections.

8. An optical transmission apparatus according to claim 7, further comprising;

an intensity modulator serially connected to said multiplexing section via an optical fiber, to intensity modulate the optical signal output from said multiplexing section, wherein said temperature monitoring section detects the temperatures of said electronic circuit sections, and detects on at least one site the temperature of the optical fiber which connects between said multiplexing section and said intensity modulator, and said delay amount control section controls the delay amount in said delay amount varying section based on the temperatures monitored by said temperature monitoring sections, to compensate for the delay deviation between the drive signals which occurs according to the temperature variation in the delay amount of the electric signal propagated through each of said electronic circuit sections and the temperature variation in the delay amount of the optical signal propagated through said optical fiber.

9. An optical transmission apparatus according to claim 1, wherein said plurality of optical modulating sections are connected in parallel to each other, there is provided a multiplexing section that multiplexes the optical signals output from said plurality of optical modulating sections to output a time division multiplexed optical signal, said temperature monitoring section detects on at least one site the temperatures of optical fibers which connect between said plurality of optical modulating sections and said multiplexing section, and said delay amount control section controls the delay amount in said delay amount varying section based on the temperatures monitored by said temperature monitoring section, to compensate for the delay deviation between the drive signals which occurs according to the temperature variation in the delay amount of the optical signal propagated through said optical fibers.

10. An optical transmission apparatus according to claim 1, wherein said plurality of optical modulating sections each includes respective modulation electrodes formed on a plurality of branching waveguides of a Mach-Zehnder interferometer, and the drive signals output from said plurality of driving sections are provided for said respective modulation electrodes, said temperature monitoring section detects on at least one site the temperatures of electronic circuit sections including said plurality of driving sections and said delay amount varying section, and said delay amount control section controls the delay amount in said delay amount varying section based on the temperatures monitored by said temperature monitoring section, to compensate for the delay deviation between the drive signals which occurs according to the temperature variation in the delay amount of the electric signal propagated through each of said electronic circuit sections.

11. An optical transmission apparatus according to claim 1, wherein said plurality of optical modulating sections are integrated on a common substrate.

12. An optical transmission apparatus according to claim 1, wherein said delay amount control section calculates a differential delay between the drive signals which corresponds to the temperature monitored by said temperature monitoring section, in accordance with a relational expression in which the differential delay between the drive signals to be provided for said plurality of optical modulating sections is represented by a temperature function, to control the delay amount in said delay amount varying section according to said calculated differential delay.

13. An optical transmission apparatus according to claim 12, wherein said relational expression is a linear function or a multi-order function relative to the temperature.

14. An optical transmission apparatus according to claim 12, wherein said relational expression is the broken line approximation relative to the temperature.

15. An optical transmission apparatus according to claim 12, wherein said delay amount control section changes coefficients of said relational expression according to post-switched wavelength information which is transmitted at the wavelength switching.

16. An optical transmission apparatus according to claim 1, wherein said plurality of optical modulating sections each performs at least one of the optical intensity modulation and the optical phase modulation.

17. An optical transmission apparatus according to claim 1, wherein the optical signal modulated in each of said plurality of optical modulating sections is an optical signal corresponding to a phase containing binary modulation format (DPSK) or a phase containing quaternary modulation format (DQPSK).

18. An optical transmission apparatus according to claim 17, wherein the optical signal modulated in each of said plurality of optical modulating sections is pulsed.

* * * * *